United States Patent
Ishimoto et al.

(10) Patent No.: US 10,684,218 B2
(45) Date of Patent: Jun. 16, 2020

(54) MOISTURE DETECTING APPARATUS FOR RECORDING MATERIAL AND IMAGE FORMING APPARATUS

(71) Applicant: CANON KABUSHIKI KAISHA, Tokyo (JP)

(72) Inventors: Mizuki Ishimoto, Numazu (JP); Norio Matsui, Mishima (JP); Masafumi Monde, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 15/943,842

(22) Filed: Apr. 3, 2018

(65) Prior Publication Data

US 2018/0292314 A1    Oct. 11, 2018

(30) Foreign Application Priority Data

Apr. 11, 2017 (JP) .................................. 2017-078477
Apr. 11, 2017 (JP) .................................. 2017-078478

(51) Int. Cl.

| G01N 21/3559 | (2014.01) |
| G03G 15/00 | (2006.01) |
| G01N 21/359 | (2014.01) |
| G01N 21/31 | (2006.01) |
| G01N 21/86 | (2006.01) |

(Continued)

(52) U.S. Cl.
CPC ..... *G01N 21/3559* (2013.01); *G01N 21/3151* (2013.01); *G01N 21/359* (2013.01); *G01N 21/4738* (2013.01); *G03G 15/5029* (2013.01); *G01N 2021/3155* (2013.01);

(Continued)

(58) Field of Classification Search
CPC ............ G01N 21/3559; G01N 21/359; G01N 21/3151; G01N 21/4738; G01N 2021/8663; G01N 2021/3155; G01N 2021/3181; G03G 15/5029; G03G 15/0189; G03G 15/0216
See application file for complete search history.

(56) References Cited

U.S. PATENT DOCUMENTS

| 8,750,732 B2 | 6/2014 | Ishii et al. |
| 9,157,853 B2 | 10/2015 | Ishii et al. |

(Continued)

FOREIGN PATENT DOCUMENTS

| JP | H08-54264 A | 2/1996 |
| JP | H08-82598 A | 3/1996 |

(Continued)

*Primary Examiner* — Susan S Lee
(74) *Attorney, Agent, or Firm* — Venable LLP

(57) ABSTRACT

A moisture detecting apparatus includes: a light emitting unit including a first light source configured to emit light having a first wavelength as a peak wavelength, and a second light source configured to emit light having a second wavelength as a peak wavelength; a detecting unit configured to detect a first detection value indicating an extent to which the light emitted from the first light source is transmitted through a recording material, and a second detection value indicating an extent to which the light emitted by the second light source is transmitted through the recording material, based on a light receiving result of a light receiving unit; and a determination unit configured to determine a value related to a moisture content of the recording material based on the first detection value and the second detection value.

29 Claims, 20 Drawing Sheets

(51) Int. Cl.
*G01N 21/47* (2006.01)
*G03G 15/01* (2006.01)
*G03G 15/02* (2006.01)

(52) U.S. Cl.
CPC ........... *G01N 2021/3181* (2013.01); *G01N 2021/8663* (2013.01); *G03G 15/0189* (2013.01); *G03G 15/0216* (2013.01)

(56) References Cited

U.S. PATENT DOCUMENTS

| | | |
|---|---|---|
| 9,223,403 B2 | 12/2015 | Araki et al. |
| 2013/0057861 A1 | 3/2013 | Ishii et al. |
| 2014/0161475 A1 | 6/2014 | Matsui |
| 2014/0246590 A1 | 9/2014 | Ishii et al. |
| 2016/0152052 A1 | 6/2016 | Namiki et al. |
| 2019/0162672 A1* | 5/2019 | Sakakibara ............ G01N 21/89 |
| 2020/0004178 A1* | 1/2020 | Yamamoto ......... G03G 15/5029 |

FOREIGN PATENT DOCUMENTS

| | | | |
|---|---|---|---|
| JP | H09-61351 A | | 3/1997 |
| JP | 09114200 A | * | 5/1997 |
| JP | H09-210902 A | | 8/1997 |
| JP | 2006-023255 A | | 1/2006 |
| JP | 2009-069048 A | | 4/2009 |
| JP | 2013-057513 A | | 3/2013 |
| JP | 2014-114131 A | | 6/2014 |

\* cited by examiner

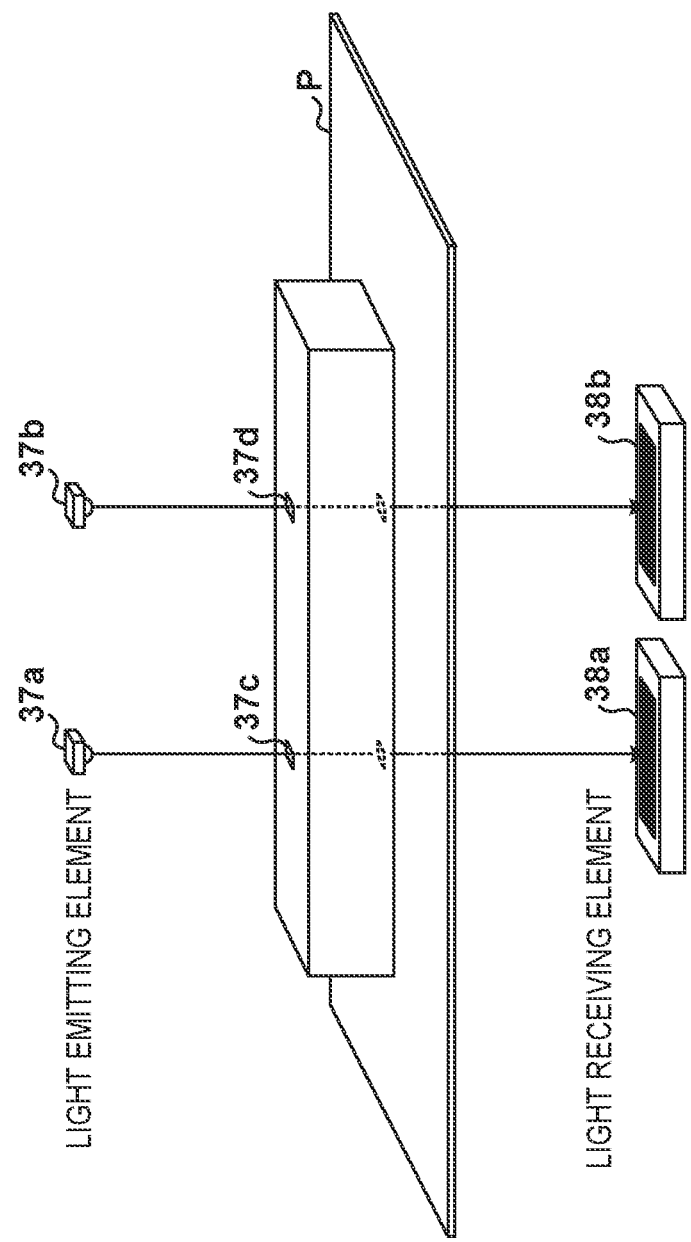

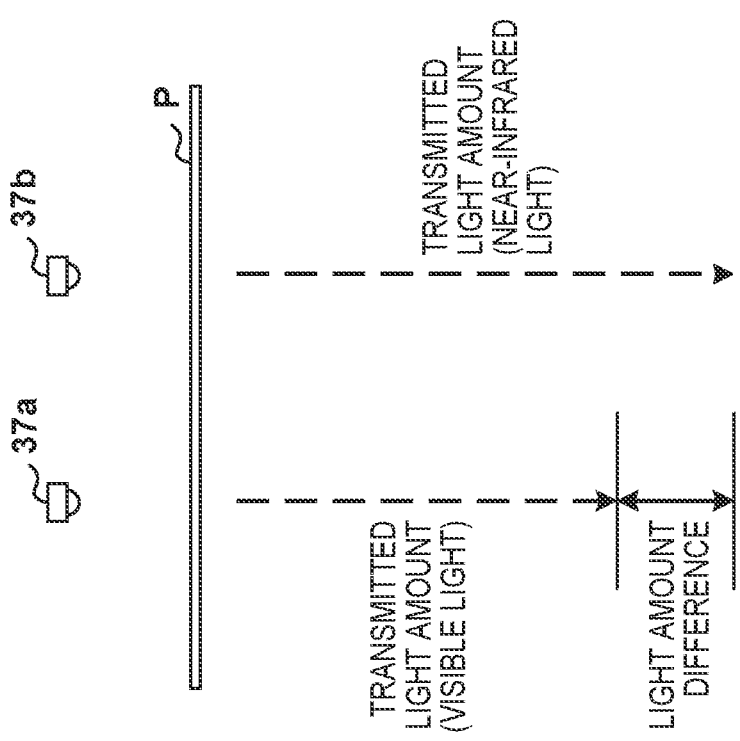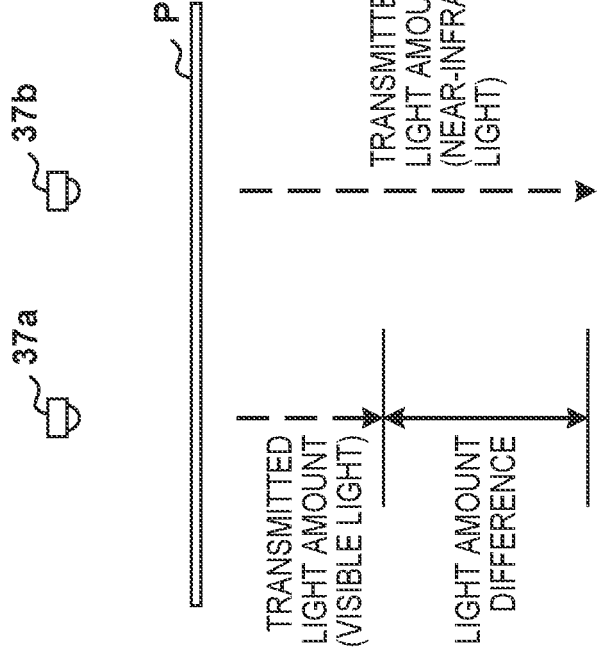

MOISTURE DETECTING APPARATUS FOR RECORDING MATERIAL AND IMAGE FORMING APPARATUS

BACKGROUND OF THE INVENTION

Field of the Invention

The present invention relates to a moisture detecting apparatus that detects a value related to moisture content contained in a recording material and an image forming apparatus including the moisture detecting apparatus.

Description of the Related Art

Japanese Patent Laid-Open No. 2013-57513 and Japanese Patent Laid-Open No. H08-82598 disclose configurations for detecting moisture content contained in an object to be measured. In Japanese Patent Laid-Open No. 2013-57513, moisture content is detected by detecting inner scattered light of a recording material using light at an absorption wavelength of water (1450 nm) and light at a non-absorption wavelength of water (1300 nm). Also, in Japanese Patent Laid-Open No. H08-82598, moisture content is detected by emitting light at an absorption wavelength of water and light at a non-absorption wavelength of water onto an object to be measured, and detecting transmitted light or reflection light from the object to be measured. In addition, Japanese Patent Laid-Open No. H09-210902 and Japanese Patent Laid-Open No. H09-61351 also disclose configurations in which light in an absorption wavelength range of water and light in a non-absorption wavelength range of water are emitted onto a detection target whose moisture content is to be detected and the moisture content of the detection target is detected.

However, in the configurations described in the above documents, it is necessary to provide a light source that emits light at 1450 nm and 1940 nm which are absorption wavelength of waters, and a light receiving element with which a necessary light-receiving sensitivity in these wavelengths can be obtained. Specifically, an expensive optical element such as an LED or a photo-diode using InGaAs (Indium Gallium Arsenide) as a material is necessary, and therefore the cost is increased.

SUMMARY OF THE INVENTION

According to an aspect of the present invention, a moisture detecting apparatus includes: a light emitting unit including a first light source configured to emit light having a first wavelength of visible light or near-infrared light as a peak wavelength, and a second light source configured to emit light having a second wavelength of visible light or near-infrared light that is longer than the first wavelength as a peak wavelength; a light receiving unit configured to receive light emitted from the first light source and transmitted through a recording material, and light emitted by the second light source and transmitted through the recording material; a detecting unit configured to detect a first detection value indicating an extent to which the light emitted from the first light source is transmitted through the recording material, and a second detection value indicating an extent to which the light emitted by the second light source is transmitted through the recording material, based on a light receiving result of the light receiving unit; and a determination unit configured to determine a value related to a moisture content of the recording material based on the first detection value and the second detection value.

Further features of the present invention will become apparent from the following description of exemplary embodiments with reference to the attached drawings.

BRIEF DESCRIPTION OF THE DRAWINGS

FIG. 2B is a configuration diagram of a moisture detecting apparatus according to an embodiment.

FIG. 3A is a diagram for illustrating a moisture detection principle according to an embodiment.

FIG. 3B is a diagram for illustrating a moisture detection principle according to an embodiment.

DESCRIPTION OF THE EMBODIMENTS

In the following, exemplary embodiments of the present invention will be described with reference to the drawings. Note that, the following embodiments are exemplary and the present invention is not limited to the contents of the embodiments. In addition, in the following drawings, constituent elements that are not necessary for the description of the embodiments are omitted.

First Embodiment

Figure 1:
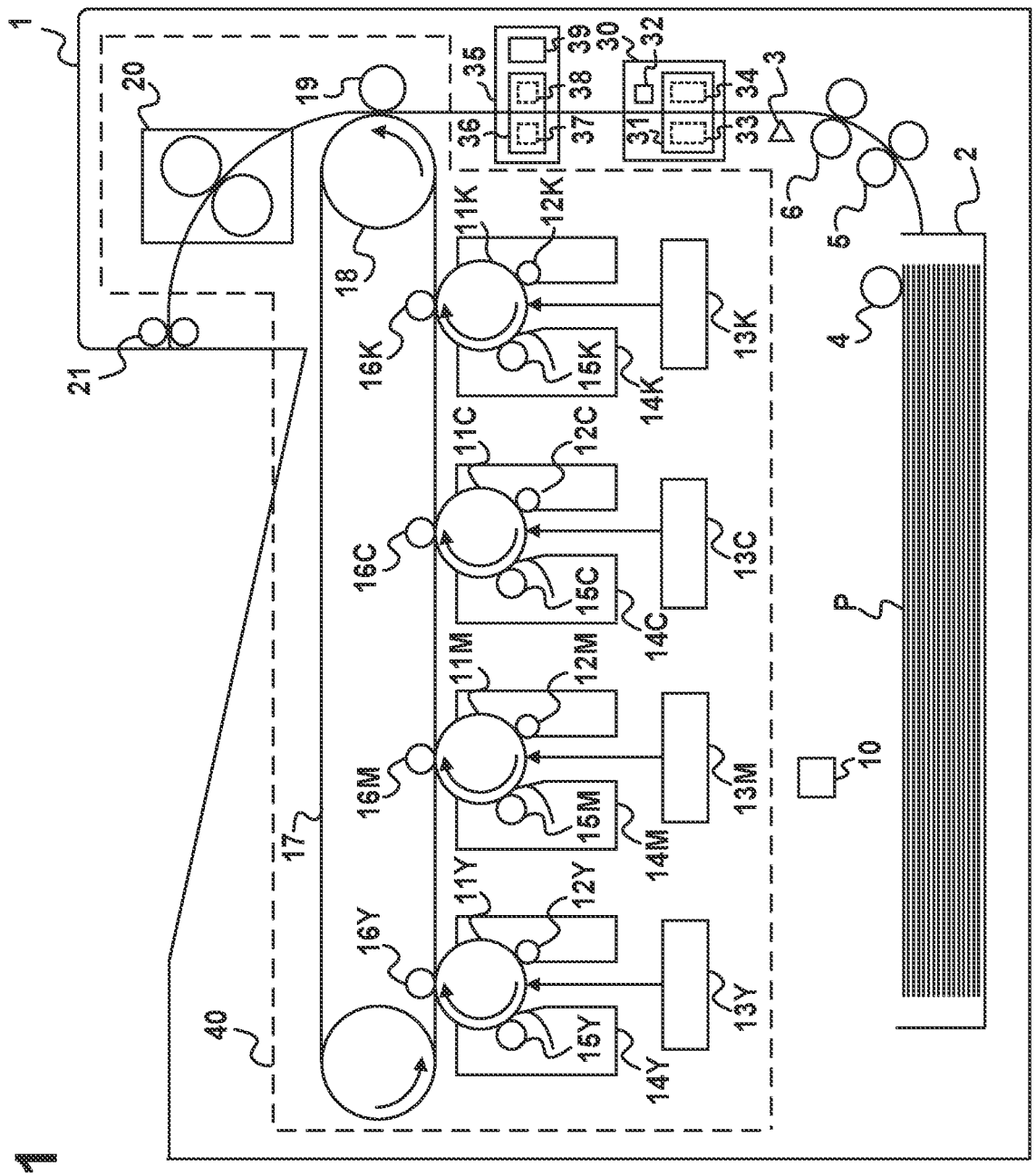
FIG. 1 is a configuration diagram of an image forming apparatus according to an embodiment.

FIG. 1 is a schematic configuration diagram of an image forming apparatus 1 including a moisture detecting apparatus according to this embodiment. The image forming apparatus 1 forms color images by superimposing toner images formed with toners (developing materials) of the four colors yellow (Y), magenta (M), cyan (C), and black (B), respectively. In FIG. 1, Y, M, C, and K suffixed to the reference signs indicate that the colors of the toner related to forming by the corresponding members are yellow, magenta, cyan, and black, respectively. Note that, if the toner colors do not need to be distinguished in the following description, reference signs without alphabetical suffixes are used.

A photosensitive member 11 is an image carrier, and, when forming an image, is rotationally driven in a direction shown by the arrow in the diagram. A charge roller 12 charges a surface of the photosensitive member 11 to a uniform potential. A scanner 13 scans and exposes the charged photosensitive member 11 with light and forms an electrostatic latent image on the photosensitive member 11. A developing unit 14 includes a toner of the corresponding color, causes the toner to adhere the electrostatic latent image on the photosensitive member 11 by a developing bias output by a developing roller 15, and thereby forms a toner image on the photosensitive member 11. A primary transfer roller 16 outputs a primary transfer bias and transfers the toner image on the photosensitive member 11 to an intermediate transfer belt 17. The intermediate transfer belt 17 is rotationally driven dependent on the rotation of a driving roller 18 when forming an image. The toner images formed on the photosensitive members 11 are transferred to the rotationally driven intermediate transfer belt 17 in a superimposed manner, whereby a multi-color toner image can be formed. Also, the toner images transferred to the intermediate transfer belt 17 are conveyed to a position opposing the secondary transfer roller 19 by rotation of the intermediate transfer belt 17.

Also, a recording material P in a paper feeding cassette 2 is fed to a conveyance path by a paper feeding roller 4, and conveyed to a position opposing the secondary transfer roller 19 by a pair of conveyance rollers 5 and a pair of registration rollers 6. The secondary transfer roller 19 outputs a secondary transfer bias and transfers the toner image on the intermediate transfer belt 17 to the recording material P. The recording material P to which the toner image was transferred is conveyed to a fixing unit 20. The fixing unit 20 applies heat and pressure to the recording material P and fixes the toner image on the recording material P. The recording material P on which the toner image was fixed is discharged to the outside of the image forming apparatus 1 by a paper discharge roller 21. In FIG. 1, members surrounded by a dotted line indicated by a reference sign 40 constitute an image forming unit that forms an image on the recording material P.

A registration sensor 3 that detects the recording material P is provided on the downstream side in the conveyance direction of the recording material relative to the pair of registration rollers 6. Also, a recording material discriminating apparatus 30 is provided on the downstream side of the registration sensor 3 and on the upstream side relative to the secondary transfer roller 19 in the conveyance direction. The recording material discriminating apparatus 30 includes a basis weight detecting unit 31 that has a transmitting unit 33 and a receiving unit 34 and detects a basis weight of the recording material P, and a surface property detecting unit 32 that detects a surface property of the recording material P. Moreover, a moisture detecting apparatus 35 is provided on the downstream side of the recording material discriminating apparatus 30 and on the upstream side of the secondary transfer roller 19 in the conveyance direction. The moisture detecting apparatus 35 is provided with a moisture detecting sensor unit 36 including a light emitting unit 37 and a light receiving unit 38, and a moisture detecting control unit 39.

A control unit 10 of the image forming apparatus 1 performs control of the whole of the image forming apparatus 1, and is provided with at least one processor and a nonvolatile memory that stores program and data used by the processor, a RAM used as a work area of the processor, and the like. The control unit 10, for example, decides a print mode corresponding the kind of the recording material P that was detected by the recording material discriminating apparatus 30, and collectively controls the operations of the image forming apparatus 1.

Figure 2A:
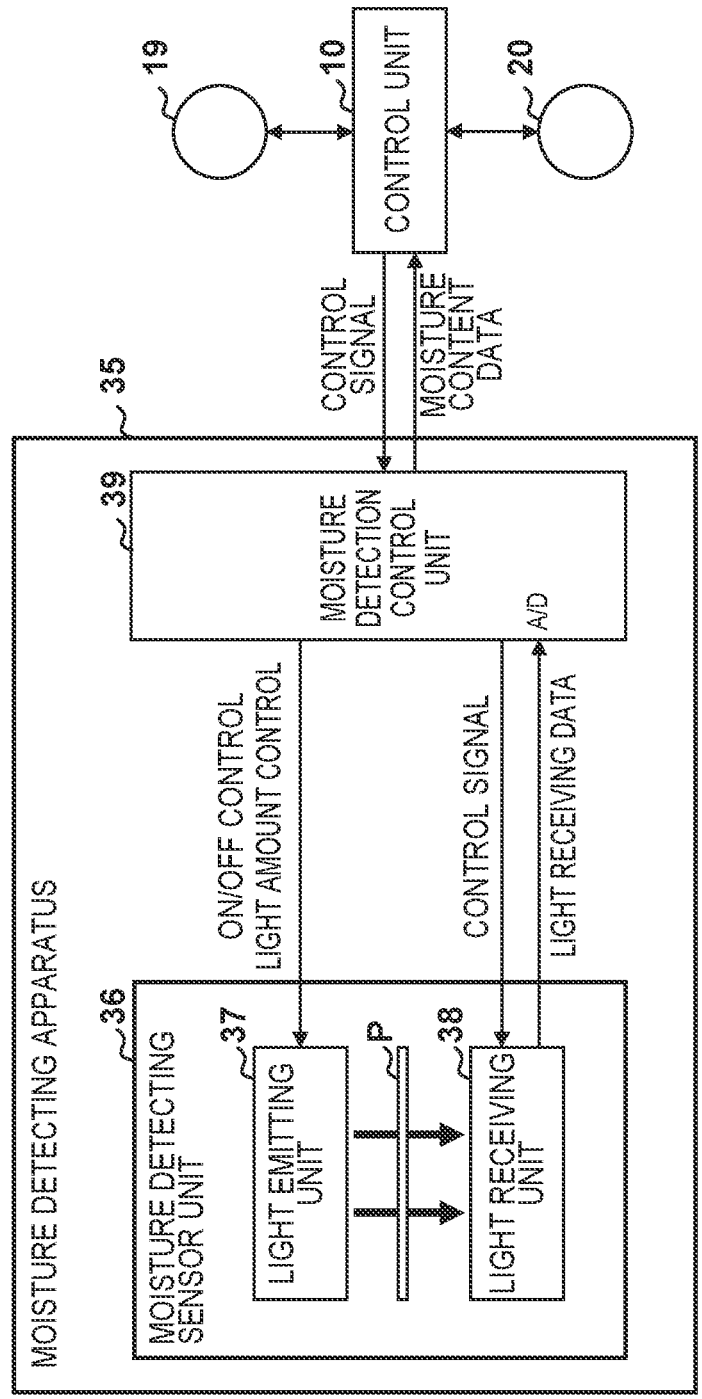
FIG. 2A is a configuration diagram of a moisture detecting apparatus according to an embodiment.

Next, the moisture detecting apparatus 35 will be described. FIG. 2A is a block diagram of the moisture detecting apparatus 35. A moisture detecting sensor unit 36 includes the light emitting unit 37 and the light receiving unit 38 that are provided on opposite sides of the conveyance path of the recording material P, and light emitted from the light emitting unit 37 is received by the light receiving unit 38. Here, the detailed configurations of the light emitting unit 37 and the light receiving unit 38, which form a principle portion of the moisture detecting sensor unit 36, are shown in FIG. 2B.

The light emitting unit 37 is constituted by a light emitting element 37a, a light emitting element 37b, and a drive circuit for driving these elements (not shown). In this embodiment, the light emitting element 37a is an LED that emits light having a peak wavelength of 560 nm, and the light emitting element 37b is an LED that emits light having a peak wavelength of 850 nm. The wavelength band from approximately 400 to 800 nm is generally called the visible light range, and the wavelength band from approximately 800 to 2500 nm is generally called the near-infrared light range. Accordingly, in the following, light emitted from the light emitting element 37a is denoted as "visible light", and light emitted from the light emitting element 37b is denoted as "near-infrared light" to distinguish between the two kinds of light. Note that the above-described wavelengths of the light emitting elements 37a and 37b are merely examples, and they may be any wavelengths as long as they are within the visible light range or the near-infrared light range.

The visible light emitted from the light emitting unit 37a is irradiated onto the recording material P via an aperture 37c. Similarly, the near-infrared light emitted from the light emitting element 37b is irradiated onto the recording material P via an aperture 37d. The apertures 37c and 37d are provided for regulating the irradiated area on the surface of the recording material P, and for causing the light transmitted through the recording material P to be received in a desired range on the light receiving unit 38. However, if the light emitting elements 37a and 37b emit light with high directivity, it is not necessary to provide the apertures 37c and 37d.

The light receiving unit 38 is provided with a light receiving element 38a and a light receiving element 38b. The light receiving elements 38a and 38b are photo electronic conversion elements such as general-purpose CMOS sensors. Note that it is possible to use sensors using semiconductor silicon such as Si photodiodes, Si phototransistors, CCD sensors, and NMOS sensors, as the light receiving elements. Also, sensors whose light-receiving surface is area shaped or line shaped also can be used. In general, these photo electronic conversion elements have light receiving sensitivity in a wavelength band from approximately 400 to 1000 nm. In other words, the light receiving elements 38a and 38b have light receiving sensitivity in a wavelength band including the peak wavelengths of the light emitting element 37a and the light emitting element 37b.

Visible light and near-infrared light transmitted through the recording material P are respectively received by the light receiving elements 38a and 38b. Note that, in this embodiment, the two light receiving elements 38a and 38b respectively corresponding to the two light emitting elements 37a and 37b are used. However, it is sufficient if the transmitted light emitted from the light emitting elements 38a and 38b that is transmitted through the recording material P can be distinguished from each other and detected, and the configuration of the moisture detecting sensor unit 36 is not limited to the configuration shown in FIG. 2B. For example, if the transmitted light emitted from the light emitting elements 37a and 37b can be irradiated onto different ranges of the light receiving element, and the light receiving element can separately output signals indicating the received light amounts of transmitted light emitted from the light emitting element 37a and transmitted light emitted from the light emitting element 37b, it is possible to use one light receiving element. Moreover, if control is performed such that the light emitting timings of the light emitting elements 38a and 38b are differentiated, the light receiving amount can be detected individually even if the light receiving ranges of the transmitted light emitted from the light emitting elements 38a and 38b overlap. Furthermore, regarding the distance between the light emitting elements, the apertures and the light receiving elements and the emission angle of light, it is sufficient if the transmitted light of the recording material P can be received, and, for example, a configuration can be applied in which light is obliquely emitted toward the recording material and the light receiving surface.

Returning to FIG. 2A, the moisture detecting control unit 39 will be described. The moisture detecting control unit 39 performs ON/OFF control of the lights emitted from the light emitting elements 37a and 37b of the light emitting unit 37, and light amount control (light intensity control), of the light emitting unit 37. Note that these controls are performed based on the control signals from the control unit 10. The light emission amount of the light emitting elements 37a and 37b is controlled such that the amount of light that is transmitted through the recording material P is the amount that is receivable by the light receiving elements 38a and 38b. Note that the optimal light emission amount differs depending on characteristics of the light emitting elements and the light receiving elements. Also, in a light emitting element such as an LED, the light emission amount may fluctuate temporally due to the influence of voltage fluctuation of the driving circuit in some cases, which causes a decrease in the detection accuracy of moisture content. In this case, it is possible to stabilize the light emission amount by a constant current circuit or the like, for example. Furthermore, the moisture detecting control unit 39 outputs control signals that control the light receiving timing to the light receiving unit 38. By doing this, the light receiving times of the light receiving elements 38a and 38b are controlled to be equal to each other.

In addition, the moisture detecting control unit 39 obtains light receiving data indicating the light receiving amounts of visible light and near-infrared light from the light receiving unit 38, and calculates a value related to the moisture amount (moisture content) of the recording material P based on the light receiving data. Then, moisture content data indicating a value related to the calculated moisture content is input to the control unit 10. Note that the moisture detecting control unit 39 can be realized on an application specific integrated circuit (ASIC), and in this embodiment, the moisture detecting control unit 39 is realized on an ASIC. However, it is also possible to realize the moisture detecting control unit 39 by causing the processor of the control unit 10 of the image forming apparatus 1 to execute a program.

The control unit 10 of the image forming apparatus 1 performs output of the control signal to the moisture detecting control unit 39, and controls image forming conditions according to the moisture content data obtained from the moisture detecting apparatus 35. For example, the control unit 10 controls the secondary transfer bias that is a transfer voltage output by the secondary transfer roller 19 and a transfer current flowing due to the secondary transfer bias according to the moisture content of the recording material P. Also, the control unit 10 controls a fixing temperature of the fixing unit 20 according to the percentage of moisture content of the recording material P. Specifically, since a resistance of the recording material P increases when the moisture content of the recording material P is low, the control unit 10 increases the secondary transfer bias such that the transfer current increases. Also, since there is a concern of a fixing failure when the moisture content of the recording material P is high, the control unit 10 increases the fixing temperature.

In the following, calculation of the percentage of moisture content which is a value related to moisture content of the recording material will be described. First, the light receiving amounts when the light receiving elements 38a and 38b are caused to receive the light emitted from the light emitting elements 37a and 37b without the light being transmitted through the recording material P are hereinafter called light receiving amounts without paper. Also, the light receiving amounts when the light receiving elements 38a and 38b are caused to receive the light emitted from the light emitting elements 37a and 37b after the light has been transmitted through the recording material P are hereinafter called light receiving amounts with paper. At this time, transmission characteristics of the light emitted from each of the light emitting elements 37a and 37b, that is, a detection value indicating the extent to which the light is transmitted through the recording material P, can be calculated using the following formula (1), for example.

$$\text{Detection value} = \text{light receiving amount with paper} \times \text{coefficient/light receiving amount without paper} \quad (1)$$

In other words, a detection value indicating the transmission characteristics of the recording material P is obtained by multiplying the ratio of a light receiving amount with paper and a light receiving amount without paper by a coefficient. Here, the coefficient is for correcting the difference between the light emitting amounts of the light emitting elements 37a and 37b, and the difference between the light receiving sensitivities (spectral sensitivity characteristics) and the light receiving wavelengths of the light receiving elements 38a and 38b and obtaining a normalized light receiving amount with paper, and is calculated and stored in the moisture detecting control unit 39 in advance. Therefore, the light receiving amount with paper normalized using the coefficient and the light receiving amount without paper can be said to indicate the transmitted light amount that is transmitted through the recording material P when the light emitting elements 37a and 37b are caused to emit light at a predetermined light emission intensity. For this reason, the detection value is hereinafter referred to as the transmitted light amount. Note that, for example, if the light emission intensity of the light emitting elements 37a and 37b and the sensitivity of the light receiving elements 38a and 38b are adjusted in advance, the light receiving amount with paper is set as the transmitted light amount.

Next, the relationship between the transmitted light amount of the recording material P and the moisture content of the recording material P will be described. FIG. 3A shows the transmitted light amounts of the recording material P for visible light and near-infrared light, in a dry state without containing moisture. Since light is more easily transmitted through the recording material P as the wavelength becomes longer, the transmitted light amount of near-infrared light is larger than that of visible light.

On the other hand, when the recording material P contains moisture, the transmission characteristic of the recording material P changes depending on the moisture content contained in the recording material P. One of the factors that lead to this change is a change in the diffused reflection characteristics on the surface of the recording material P. Specifically, if light is irradiated onto the recording material P, diffused reflection occurs on the surface of the recording material P due to irregularity of plant fibers that are a main component of the recording material P. Here, if the moisture content contained in the recording material P changes, the boundary condition of the surface of the recording material P changes, and the diffused reflection amount on the surface of the recording material P changes. Specifically, if the moisture content contained in the recording material P increases, the diffused reflection amount on the recording material P decreases, and thus the transmitted light amount of the recording material P increases. Note that wavelength dependency of diffused reflection characteristics is small. Therefore, although the transmitted light amounts of visible light and near-infrared light change depending on the change in the diffused reflection characteristics due to a change in the moisture content contained in the recording material P, the amount of the change is substantially the same.

In addition, one of the factors which lead to a change in the transmission characteristics of the recording material P is absorption of light by moisture contained in the recording material P. Water has a characteristic of absorbing light (light absorption characteristic), and the extent of absorption differs depending on the wavelength of the light. Specifically, as the wavelength becomes longer, the absorption amount increases. Here, a decrease of the transmitted light amount based on the light absorption characteristics due to an increase in the moisture content of the recording material P is smaller than an increase of the transmitted light amount based on the diffused reflection characteristics. That is, if the moisture content of the recording material P increases, the transmitted light amount of near-infrared light and visible light increase as a whole, but the increase of the transmitted light of near-infrared light is smaller than the increase of the transmitted light amount of visible light. FIG. 3B shows this relationship. The transmitted light amount of the recording material P in a state of containing moisture increases compared with the recording material P in a dry state shown in FIG. 3A. Note that the increase of visible light is larger than that of near-infrared light due to the wavelength dependency of the light absorption characteristics.

In this embodiment, the difference between the transmitted light amount of visible light and the transmitted light amount of near-infrared light is set as an evaluation value for evaluating the moisture content of the recording material P. Note that the difference between the light amounts is calculated using the following the formula (2).

Difference between the light amounts=transmitted light amount of near-infrared light−transmitted light amount of visible light (2)

As described above, since there is almost no wavelength dependency in the change in the transmitted light amount based on the diffused reflection characteristics when moisture content of the recording material P changes, the change in the transmitted light amount based on the diffused reflection characteristics is balanced out in calculation of the difference between the light amounts. On the other hand, the change in the transmitted light amount based on the light absorption characteristics when the moisture content of the recording material P changes has a dependency on wavelength, and therefore the difference between the light amounts changes when moisture content of the recording material P changes.

Figure 4:
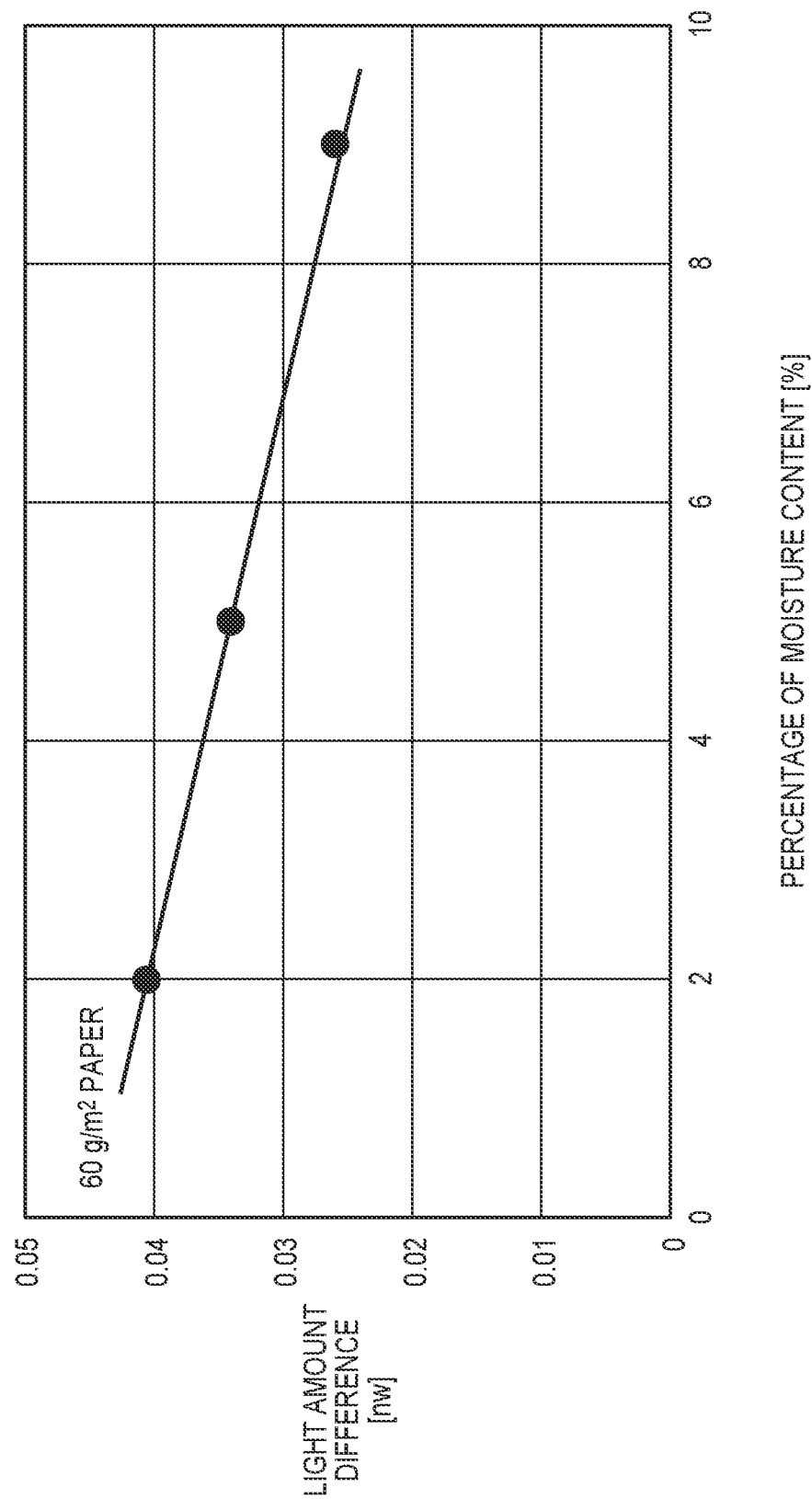
FIG. 4 is a diagram for illustrating moisture determination information according to an embodiment.

FIG. 4 shows the relationship between the percentage of moisture content of the recording material P and the difference between the light amounts. Note that the percentage of moisture content denotes the ratio (%) of the moisture content of the recording material P relative to the basis weight of the recording material P, and is a value indicating the moisture content of the recording material P. Note that FIG. 4 shows a measurement result of the percentage of moisture content and the difference between the light amounts when using plain paper whose basis weight is 60 g (60 g/m$^2$ paper) as the recording material P. As described with reference to FIGS. 3A and 3B, the difference between the light amounts decreases as the percentage of moisture content of the recording material P increases. Moisture determination information such as a formula, a table or the like, indicating the relationship shown in FIG. 4 is stored in the moisture detecting control unit 39 in advance. Then, the moisture detecting control unit 39 determines the percentage of moisture content based on the moisture determination information and the light amount difference which is the evaluation value. Note that, although the percentage of moisture content is used as the value indicating the moisture content of the recording material P in this embodiment, it is also possible to use the information indicating the relationship between the light amount and the moisture content as the moisture determination information and thus calculate the moisture content. Moreover, although the difference between the transmitted light amounts of visible light and near-infrared light is set as the evaluation value in this embodiment, as long as the value is related to water content, the present invention is not limited to the configuration in which the difference between the light amounts is set as the evaluation value. For example, the ratio between the transmitted light amount of visible light and the transmitted light amount of near-infrared light can be set as the evaluation value. That is, a configuration is also possible in which the light amount ratio indicated by the following formula (4) is used as the evaluation value.

Ratio of the light amounts=transmitted light amount of near-infrared light/transmitted light amount of visible light (4)

Figure 5A:
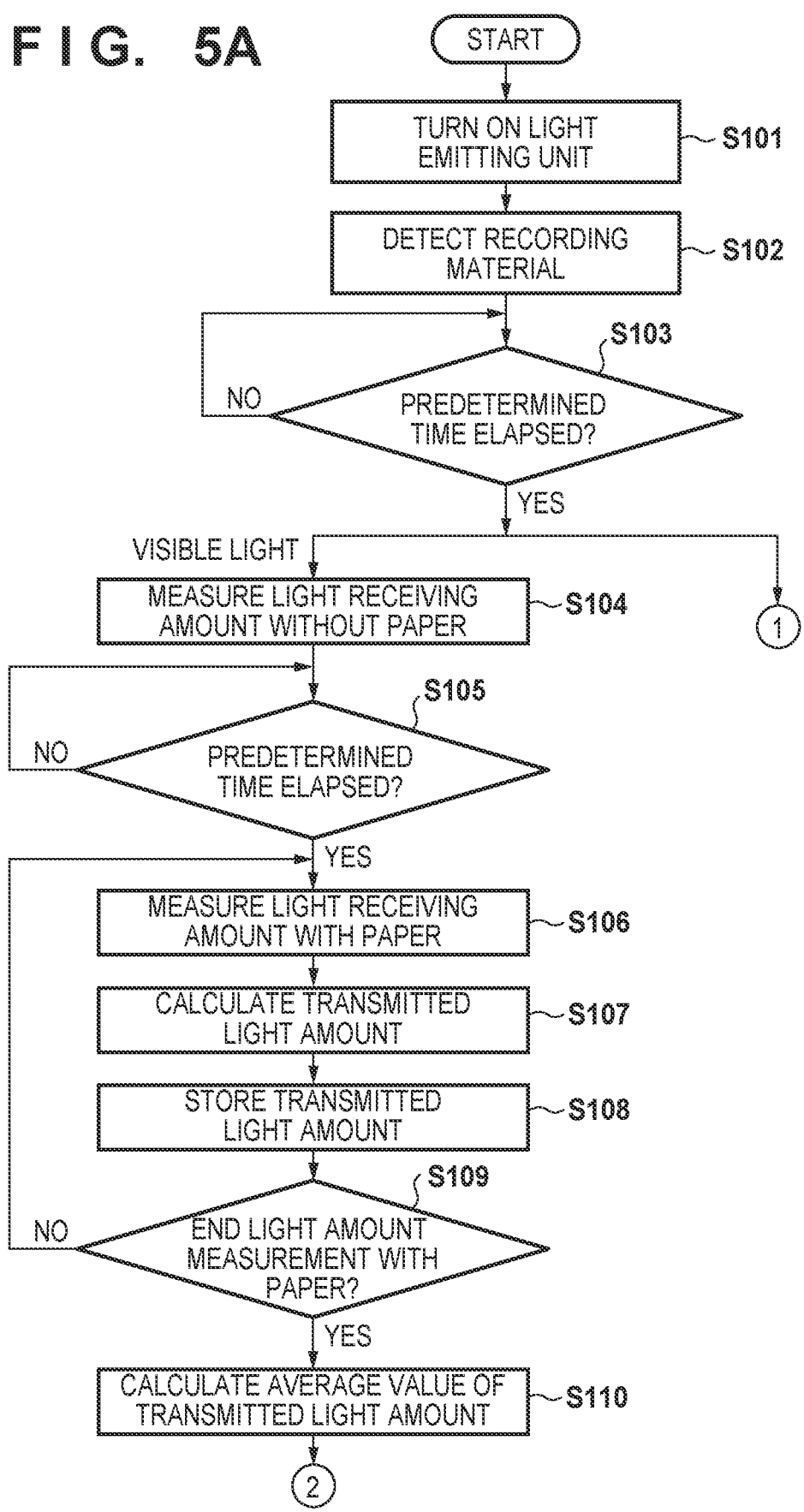
FIGS. 5A and 5B are flowcharts of moisture detection processing for a recording material according to an embodiment.
Figure 5B:
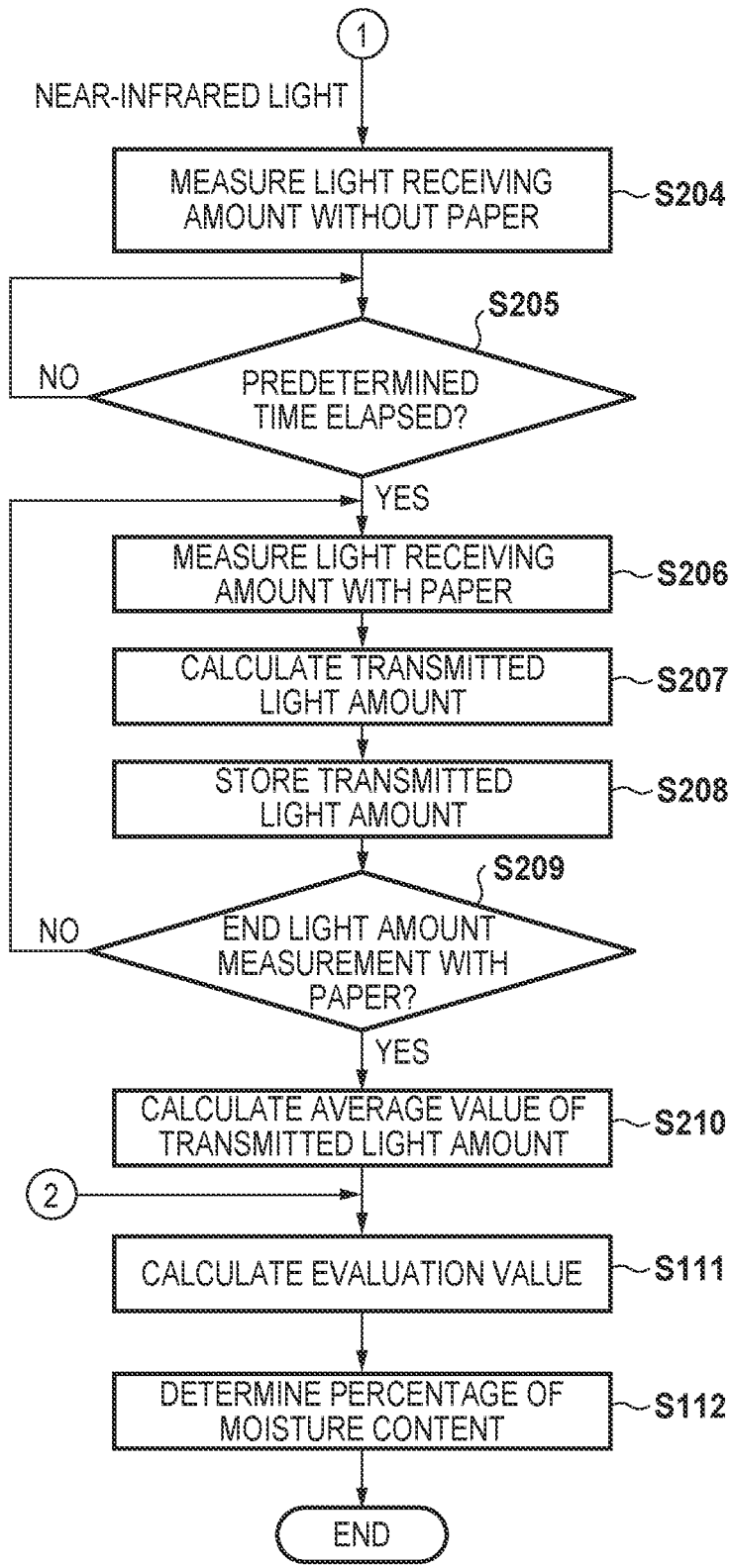

FIGS. 5A and 5B are flowcharts of the determination processing for the percentage of moisture content according to this embodiment. Upon the start of image forming, in step S101, the moisture detecting control unit 39 causes the light emitting elements 37a and 37b to emit light. In step S102, the control unit 10 detects the conveyance position of the recording material P by the registration sensor 3. After detecting the recording material P in step S102, the control unit 10, in step S103, stands by for a predetermined time. This stand-by time is the time taken for the recording material P to reach a predetermined position on the upstream side relative to a position on the light path from the light emitting unit 37 to the light receiving unit 38. When the predetermined time elapses in step S103, the control unit 10 controls the moisture detecting control unit 39 such that the measurement of the light receiving amount without paper is performed for visible light and near-infrared light in steps S104 and S204. Note that the measurement of the light receiving amount without paper is performed at the position just before the recording material P arrives on the light path from the light emitting unit 37 to the light receiving unit 38 is to suppress the influence of temporal fluctuation of light emitting intensity of the light emitting unit 37 in the measurement of light receiving amount without paper and light receiving amount with paper. After the measurement of light receiving amount without paper, the control unit 10, in step S105 and step S205, stands by for a predetermined time taken by the recording material P to reach the position at which the light receiving amount with paper can be measured. Thereafter, in step S106 and S206, the control unit 10 controls the moisture detecting control unit 39, and thereby the moisture detecting control unit 39 measures the light receiving amount with papers for visible light and near-infrared light.

In steps S107 and S207, the moisture detecting control unit 39 calculates the transmitted light amounts of visible light and near-infrared light using formula (1), and in steps S108 and S208, the transmitted light amounts of visible light and near-infrared light are stored. In steps S109 and S209, the control unit 10 determines whether or not the recording material P has left the position at which the light receiving amount with paper can be measured, and if not, the control unit 10 controls the moisture detecting control unit 39 (so as) to repeatedly perform the measurement of the light receiving amount with paper and calculation and storage of the transmitted light amounts. When the recording material P leaves the position at which the light receiving amount with paper can be measured, in steps S110 and S120, the moisture detecting control unit 39 calculates the average value of the multiple transmitted light amounts measured for visible light and near-infrared light. In step S111, the moisture detecting control unit 39 calculates the evaluation value using the average value of the transmitted light amounts for visible light and near-infrared light. Then, the moisture detecting control unit 39 determines the percentage of moisture content of the recording material P based on the moisture determination information set in advance and the evaluation value.

As described above, in this embodiment, the value indicating the water content of the recording material is calculated using light sources that emit visible light and near-infrared light and light receiving elements having sensitivity to visible light and near-infrared light. That is, the moisture content of the recording material can be detected without using a light receiving element having light receiving sensitivity to 1450 nm and 1940 nm, which are absorption wavelengths of water. Note that light receiving elements having sensitivity to visible light and near-infrared light are common and not expensive. Also, since there is variability in the thickness and density of the recording material P depending on the position thereof, variability may occur in the light receiving amount with paper depending on the measurement position. However, by detecting the light receiving amount with paper multiple times and calculating the evaluation value using the average value of the light receiving amount with paper, it is possible to suppress variability in light receiving amount with paper depending on the measurement position, and detect the value related to moisture content with high accuracy. Note that, a configuration is also possible in which the light receiving areas of the light receiving elements 38a and 38b are widened, such as by using area sensors, instead of performing the detection of the light receiving amount with paper multiple times. Also, by performing the measurement of light receiving amount without paper and the measurement of light receiving amount with paper in a predetermined time, it is possible to suppress the influence of temporal fluctuation of light emitting intensity of the light emitting elements 37a and 37b, and detect the value related to the moisture content with high accuracy. Furthermore, by performing measurement of the light receiving amounts without paper and the light receiving amounts with paper for visible light and near-infrared light in parallel, it is possible to detect the value related to moisture content with high accuracy and in short time.

Note that the present invention is not limited to the configuration in which the light emitting element 37a emits visible light and the light emitting element 37b emits near-infrared light. A configuration is also possible in which both light emitting elements 37a and 37b emits visible light or near-infrared light, as long as there are two wavelengths in which the amounts of change in the transmitted light amount due to the change in water content of the recording material P are different.

Second Embodiment

Next, regarding a second embodiment, the difference from the first embodiment will be mainly described. In this embodiment, the basis weight of the recording material P detected by the recording material discriminating apparatus 30 is also used for determination of the value related to moisture content.

The basis weight detecting unit 31 of the recording material discriminating apparatus 30 shown in FIG. 1 is an ultrasonic wave sensor that detects the basis weight of the recording material P. The basis weight detecting unit 31 includes a transmitting unit 33 that transmits ultrasonic waves to the recording material P and a receiving unit 34 that receives ultrasonic waves via the recording material P, and detects the basis weight of the recording material P according to an amplitude of the received ultrasonic waves. Note that the basis weight detecting unit 31 is not limited to the use of an ultrasonic wave sensor, and may be another type of sensor that detects the basis weight of the recording material, or a sensor that detects the thickness or the like of the recording material that is highly correlated with the basis weight.

Figure 6:
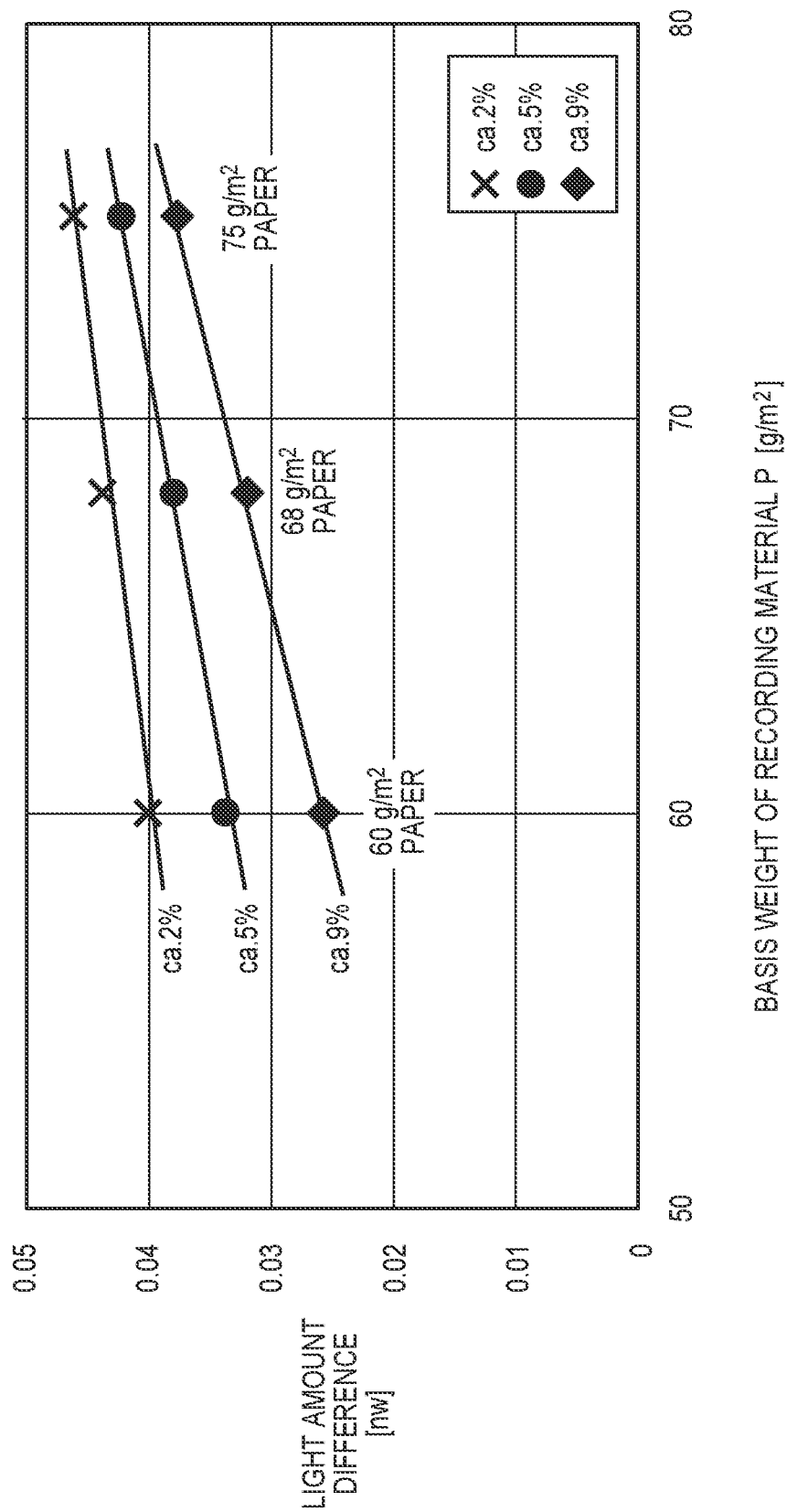
FIG. 6 is a diagram for illustrating moisture determination information according to an embodiment.

FIG. 6 shows the relationship between the basis weight of the recording material P and the difference between the transmitted light amounts of visible light and near-infrared light, in other words, the light amount difference, which is an evaluation value. FIG. 6 shows the relationship between the percentages of moisture content of approximately 2%, 5%, and 9%, and the basis weights of plain paper of 60 g/m$^2$ (60 g/m$^2$ paper), 68 g/m$^2$ (68 g/m$^2$ paper), and 75 g/m$^2$ (75 g/m$^2$ paper). In the 60 g/m$^2$ paper, 68 g/m$^2$ paper, and 75 g/m$^2$ paper in FIG. 6, the light amount difference changes with change in the basis weight of the recording material P. For this reason, the basis weight of the recording material P is detected by the basis weight detecting unit 31 and the percentage of water content of the recording material P is determined based on the relationship between the evaluation value (light amount difference) and the percentage of moisture content according to the basis weight, and thus the percentage of moisture content can be determined with high accuracy.

The determination processing of the percentage of moisture content is basically similar to the first embodiment shown in FIGS. 5A and 5B. However, in this embodiment, when the recording material P passes through the recording material discriminating apparatus 30, the basis weight of the recording material P is determined by the recording material discriminating apparatus 30. Specifically, ultrasonic waves obtained from the transmitting unit 33 via the recording material P are received by the receiving unit 34, and the amplitude value is measured. The recording material discriminating apparatus 30 determines the basis weight based on the information indicating the relationship between the amplitude value and the basis weights, which is set in advance. Then, in this embodiment, the moisture determination information indicates the relationship between the evaluation value and the percentage of water content for the basis weights of the recording materials P, as shown in FIG. 6. Then, in step S112 in FIG. 5B, the moisture detecting control unit 39 determines the percentage of moisture content based on the moisture determination information corresponding to the basis weight detected by the recording material discriminating apparatus 30 and the evaluation value.

As described above, in this embodiment, by detecting the basis weight of the recording material, highly accurate moisture content detection of the recording material based on the basis weight becomes possible. Note that, it is also possible to apply the configuration in which the basis weight is determined based on input through a touch panel and operation of a button by a user, instead of detecting the basis weight by the recording material discriminating apparatus 30.

Third Embodiment

Next, regarding this embodiment, the difference from the first and second embodiments will be mainly described. In the second embodiment, the basis weight of the recording material P is detected by the basis weight determination unit 31 of the recording material discriminating apparatus 30. In this embodiment, the range of the basis weight of the recording material P is detected using near-infrared light emitted from the light emitting element 37b of the moisture detecting sensor unit 36. Accordingly, the basis weight detecting unit 31 can be omitted in this embodiment.

Figure 7:
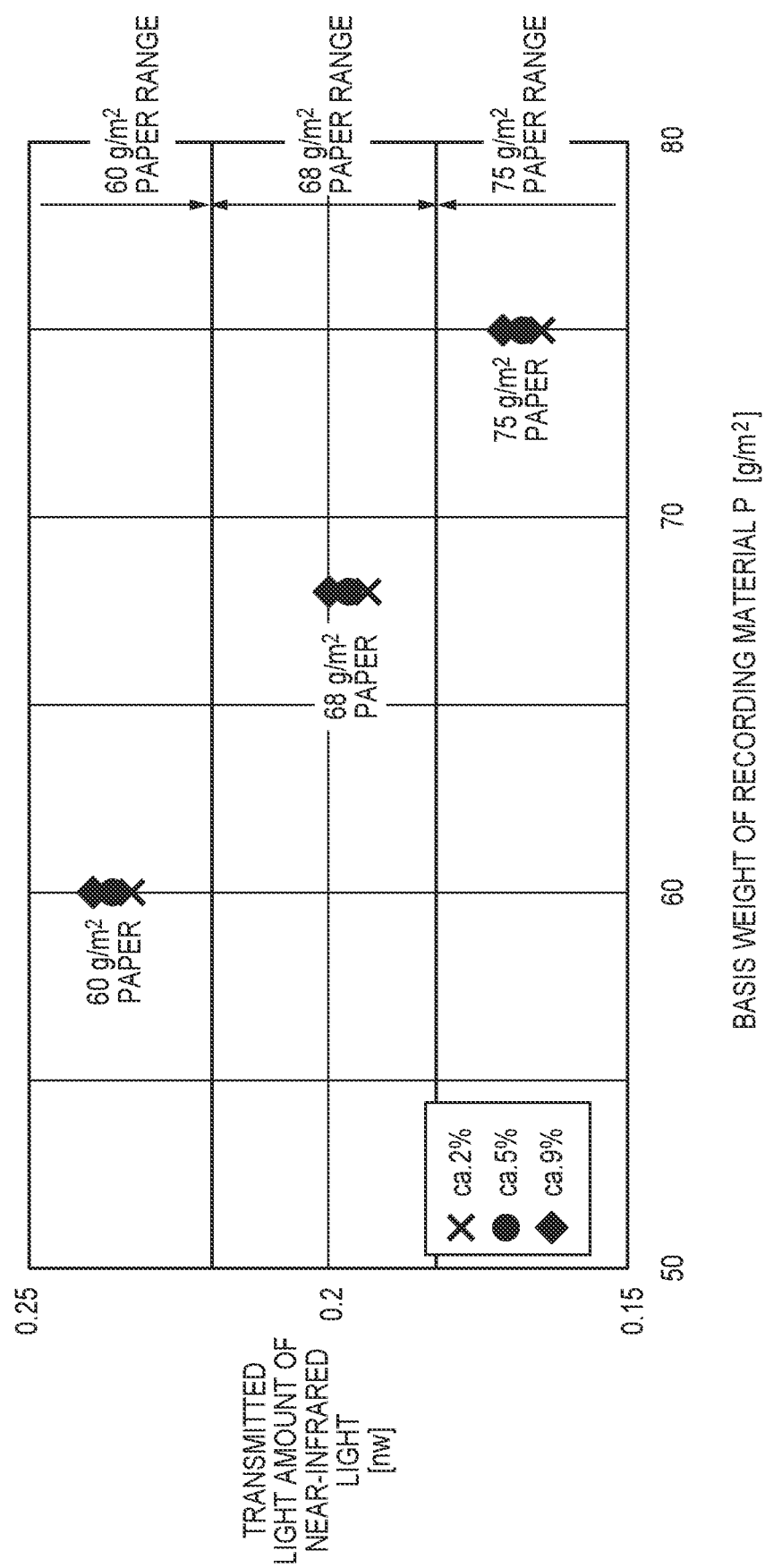
FIG. 7 is a diagram for illustrating basis weight determination information according to an embodiment.

FIG. 7 shows the relationship between the transmitted light amount and the basis weight when near-infrared light is emitted onto the recording material P. The basis weight of the recording material P and the transmitted light amount of near-infrared light are related to each other, and as the basis weight increases, the transmitted light decreases. Note that, although the transmitted light amount increases and decreases according to the percentage of moisture content of the recording material P, the increasing/decreasing range is comparatively smaller than the range of increasing/decreasing caused by the difference between the basis weights. For this reason, the approximate value (range) of the basis weight of the recording material P can be identified according to the transmitted light amount of near-infrared light.

The determination processing of the percentage of moisture content is basically similar to the first embodiment shown in FIGS. 5A and 5B. Note that, in this embodiment, basis weight determination information indicating the relationship between the transmitted light amount of near-infrared light and the basis weight is set in advance in the moisture detecting control unit 39. Then, the moisture detecting control unit 39 determines the basis weight according to the basis weight determination information and the average value of the transmitted light amounts of near-infrared light calculated in step S210 in FIG. 5B. Also, water content determination information indicating the relationship between the evaluation value and the percentage of water content, regarding the basis weight of the recording material P, is set in the moisture detecting control unit 39 in advance. Then, the moisture detecting control unit 39 determines the percentage of moisture content based on moisture determination information at the basis weight that was determined based on the transmitted light amount of near-infrared light in step S112.

As described above, also in this embodiment, similarly to the second embodiment, by considering the basis weight of the recording material P, it is possible to detect the value related to the moisture content of the recording material with high accuracy. Also, in this embodiment, the basis weight detecting unit 31 can be omitted. Note that, in this embodiment, although the basis weight of the recording material P is determined based on the transmitted light amount of near-infrared light, it is also possible to determine the basis weight of the recording material P based on the transmitted light amount of visible light.

Fourth Embodiment

Figure 8:
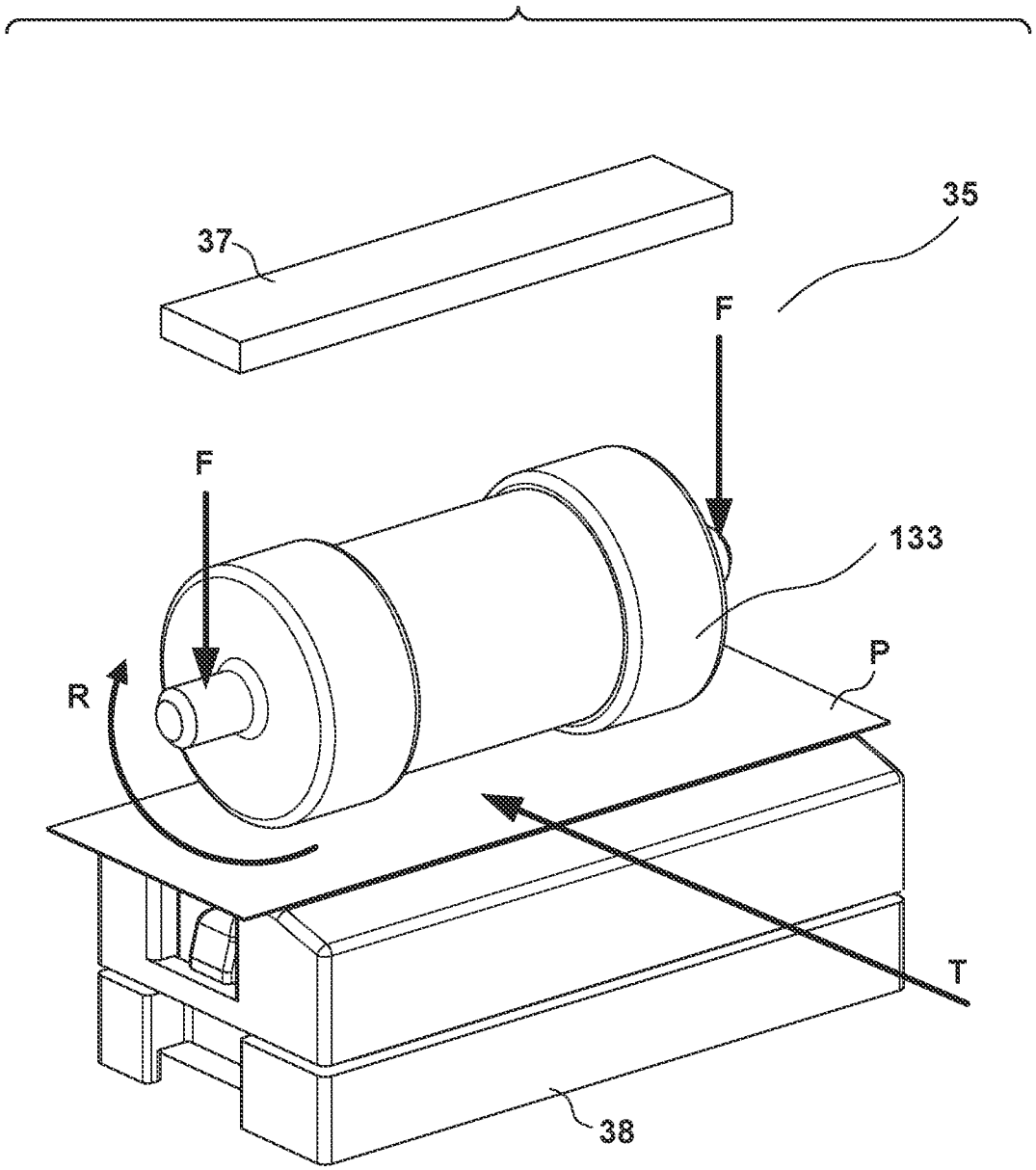
FIG. 8 is a perspective view of a moisture detecting apparatus according to an embodiment.

Next, regarding a fourth embodiment, the difference from the above embodiments will be mainly described. FIG. 8 is a perspective view showing the configuration of the moisture detecting apparatus 35 according to this embodiment. The recording material P is conveyed in the direction shown by the arrow T inside the moisture detecting apparatus 35, and in that process, a value related to moisture content is detected. As shown in FIG. 8, by the biasing mechanism which is not shown, a pressing rotational body 133 presses the recording material P conveyed on the conveyance path with a pressing force F to the conveyance path side. Note that the pressing rotational body 133 is a driven roller that is rotated in an R direction by the recording material P. That is, the recording material P is conveyed by the pair of registration rollers 6 and the secondary transfer roller 19 in a state of being held by the pressing rotational body 133, and the pressing rotational body 133 is configured so as to be rotated by the conveyance of the recording material P. By doing this, flapping of the recording material P is suppressed and the recording material P conveyed in a stable state in the moisture detecting apparatus 35.

Figure 9:
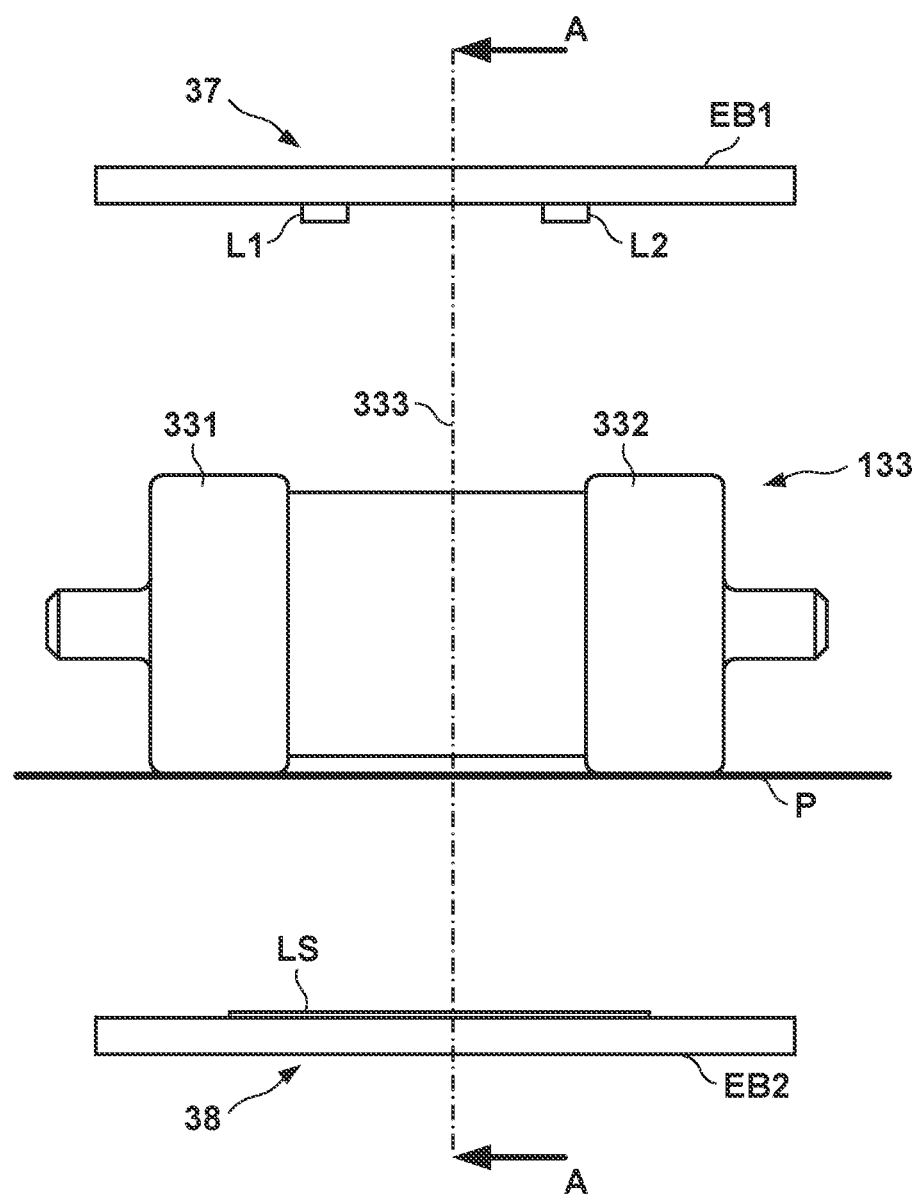
FIG. 9 is a configuration diagram of a moisture detecting apparatus according to an embodiment.

FIG. 9 is a diagram of the moisture detecting apparatus 35 viewed from the upstream side in the conveyance direction of the recording material P. A light emitting unit 37 includes light emitting elements L1 and L2 that respectively emit light at different wavelengths, such as at 560 nm and 850 nm, for example, on an electric board EB1. A light receiving unit 38 includes a line light receiving element LS provided on an electric board EB2. The line light receiving element LS includes a plurality of light receiving elements arranged in a line (linearly) in a direction perpendicular to the conveyance direction of the recording material P. The line light receiving element LS is arranged so as to be capable of receiving light emitted from light emitting elements L1 and L2 that is transmitted through the recording material P, and the light receiving elements of the line light receiving element LS output electric signals according to the light receiving amount. As the light receiving elements included in the line light receiving element LS, inexpensive elements having light receiving sensitivity around the range of visible light and near-infrared light (approximately, 400 to 1000 nm) including light emitting light wavelengths of the light emitting elements L1 and L2 can be used. Accordingly, it is not necessary to use expensive light receiving elements made of InGaAs having light receiving sensitivity in an absorption wavelength of water (e.g. 1450 nm, 1940 nm, etc.). Note that the light emitting elements L1 and L2 respectively correspond to the light emitting elements 37a and 37b in the above embodiments. Also, the light receiving element that receives the transmitted light from the light emitting element L1 among the plurality of light receiving elements of the line light receiving element LS corresponds to the light receiving element 38a in the above embodiments. Similarly, the light receiving element that receives the transmitted light from the light emitting element L2 among the plurality of light receiving elements of the line light receiving element LS corresponds to the light receiving element 38b in the above embodiments. In this embodiment, the method for detecting the value related to moisture amount (moisture content) included in the recording material P based on the output from the line light receiving element LS is similar to the above embodiments, and thus the description is omitted.

The pressing rotational body 133 is provided with two cylindrical members 331 and 332 having the same diameter that press the recording material P, and a connecting member 333 that connects the cylindrical members 331 and 332. The pressing rotational body 133 is constituted with a member that sufficiently transmits the wavelengths of the lights emitted from the light emitting elements L1 and L2, such as a transparent member. Also, the diameter of the connecting member 333 is shorter than the diameter of the cylindrical members 331 and 332. This is to prevent the connecting member 333 from coming into contact directly with a glass surface that forms part of the conveyance path of the recording material P so as to not damage the glass surface with the connecting member 333. Here, the glass surface is provided at a position opposing the connecting member 333 such that the light emitted from the light emitting elements L1 and L2 reaches the line light receiving element LS. By preventing the glass from being damaged, decrease in the later-described detection accuracy of the moisture content can be suppressed.

Figure 10:
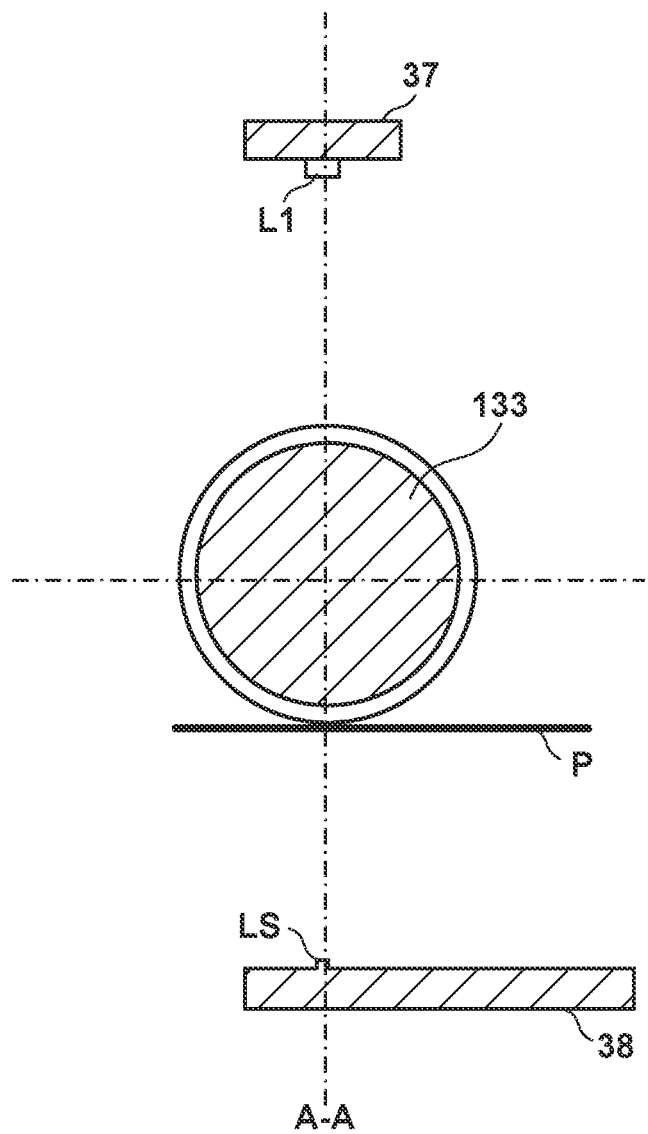
FIG. 10 is a configuration diagram of a moisture detecting apparatus according to an embodiment.
Figure 11:
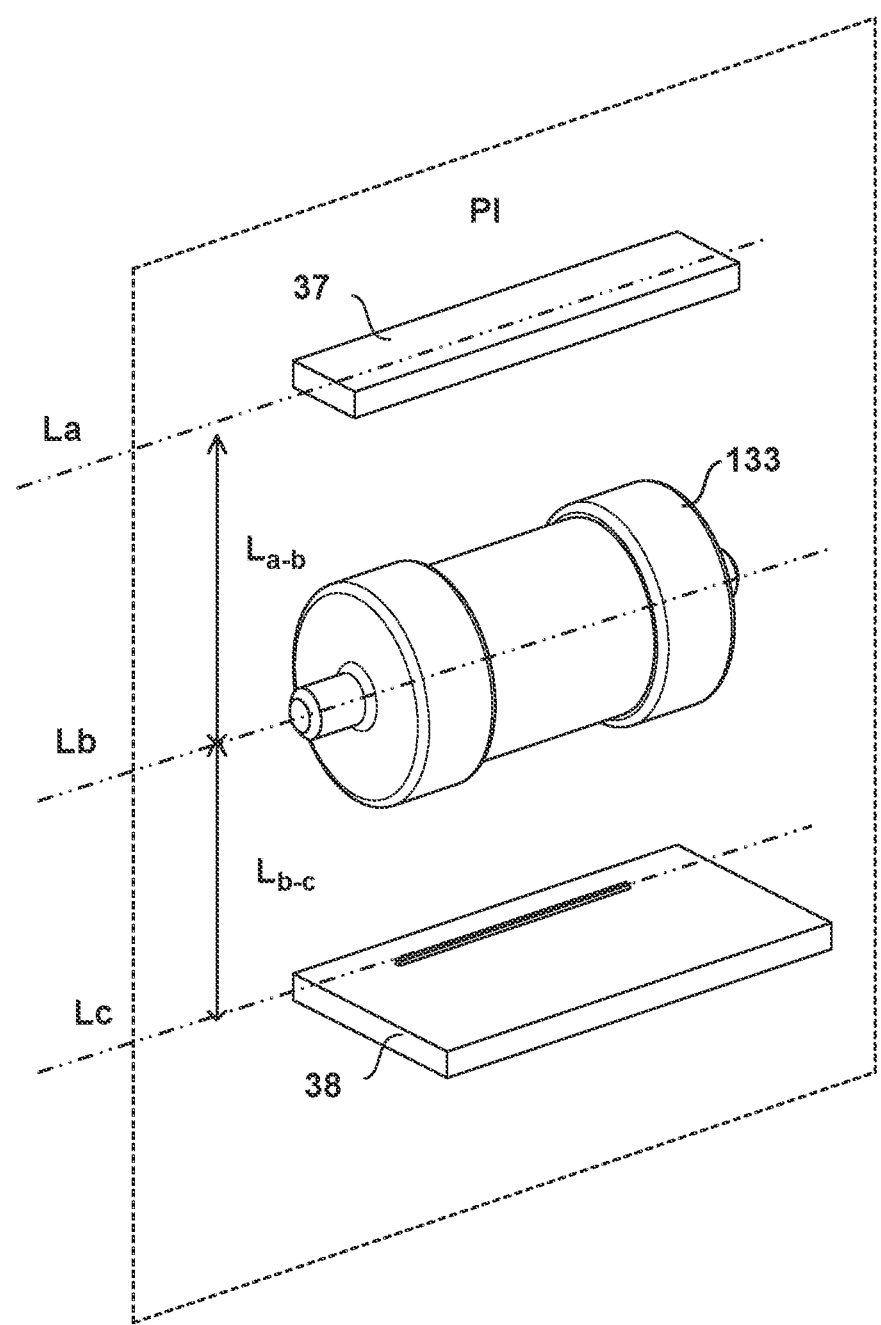
FIG. 11 is a diagram for illustrating a positional relationship of constituent elements of a moisture detecting apparatus according to an embodiment.

FIG. 10 is a cross-sectional view along a line A-A in FIG. 9, and FIG. 11 is a diagram for describing a positional relationship of the members. The light emitting elements L1 and L2, a rotational center axis of the pressing rotational body 133, and the line light receiving element LS are provided so as to be located in substantially the same plane (in a plane PI in FIG. 11, corresponding to a dot-and-dash line in the vertical direction in FIG. 10) as shown in FIG. 11. Also, as shown in FIG. 11, the members are provided such that three lines consisting of a virtual line La connecting the light emitting elements L1 and L2, a rotational center axis Lb of the pressing rotational body 133 and a line Lc in the direction in which the elements of the line light receiving element LS are arranged in parallel to each other and in the flat plane PI. Moreover, a distance $L_{a-b}$ between the virtual line La and the rotational center axis Lb and a distance $L_{b-c}$ between the rotational center axis Lb and the line Lc are set to be substantially equal.

Figure 12:
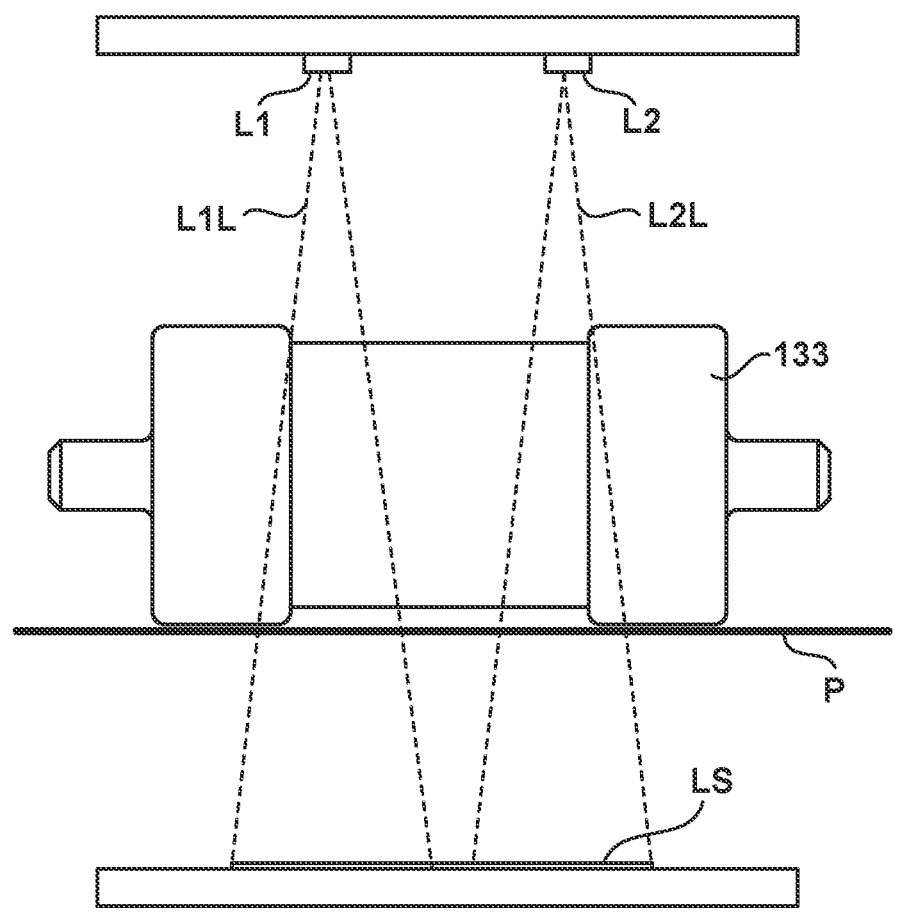
FIG. 12 is a diagram for illustrating an operation of a moisture detecting apparatus according to an embodiment.
Figure 13:
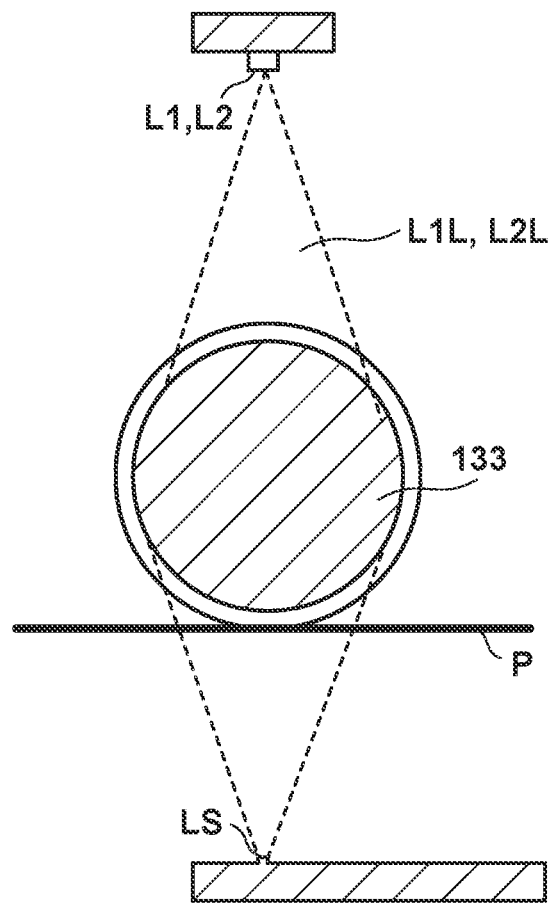
FIG. 13 is a diagram for illustrating an operation of a moisture detecting apparatus according to an embodiment.

FIGS. 12 and 13 show a state in which the light emitting elements L1 and L2 are emitting light. Note that FIGS. 12 and 13 are diagrams viewed from the same position as FIG. 9 and FIG. 10, respectively. In FIGS. 12 and 13, light emitted from the light emitting element L1 is indicated by L1L, and light emitted from the light emitting element L2 is indicated by L2L. As shown in FIG. 12, the light L1L and the light L2L emitted from the light emitting elements L1 and L2 reach the line light receiving element LS while spreading in a direction orthogonal to the conveyance direction of the recording material P. Then, based on electrical signals output by the light receiving elements of the line light receiving element LS, the light receiving amount of the light L1L and the light receiving amount of the light L2L can be determined respectively.

When passing through the transparent pressing rotational body 133, the light L1L and the light L2L are attenuated due to inner reflection, loss, and the like. Moreover, the light L1L and the light L2L are greatly attenuated due to passing through the recording material P, and reach the line light receiving element LS. Note that, as shown in FIG. 13, the pressing rotational body 133 having a circular cross section has a lens-like effect, and in the conveyance direction of the recording material P, spreading of the light emitted from the light emitting elements L1 and L2 is suppressed, and the light can be collected to the line light receiving element LS. In addition, due to the transparent pressing rotational body 133, the line light receiving element LS can detect the light receiving amount while holding the recording material P. Accordingly, it is possible to suppress the influence of moisture content being locally distributed in the conveyance direction of the recording material P, and detect the average moisture content in the surface of the recording material P.

As described above, in this embodiment, by the transparent pressing rotational body 133 pressing the recording material, flapping of the recording material is suppressed. Light is emitted onto the recording material via this transparent pressing rotational body 133, and the value related to the moisture content of the recording material is detected according to the transmitted light amount. Accordingly, it is possible to suppress the fluctuation of the transmitted light amount due to flapping of the recording material, and detect the value related to the moisture content of the recording material with high accuracy. Note that a configuration is also possible in which only an area of the pressing rotational body 133 through which the light L1L and the light L2L passes is constituted with a transparent member, instead of constituting the whole of the pressing rotational body 133 with a transparent member.

Fifth Embodiment

Figure 14:
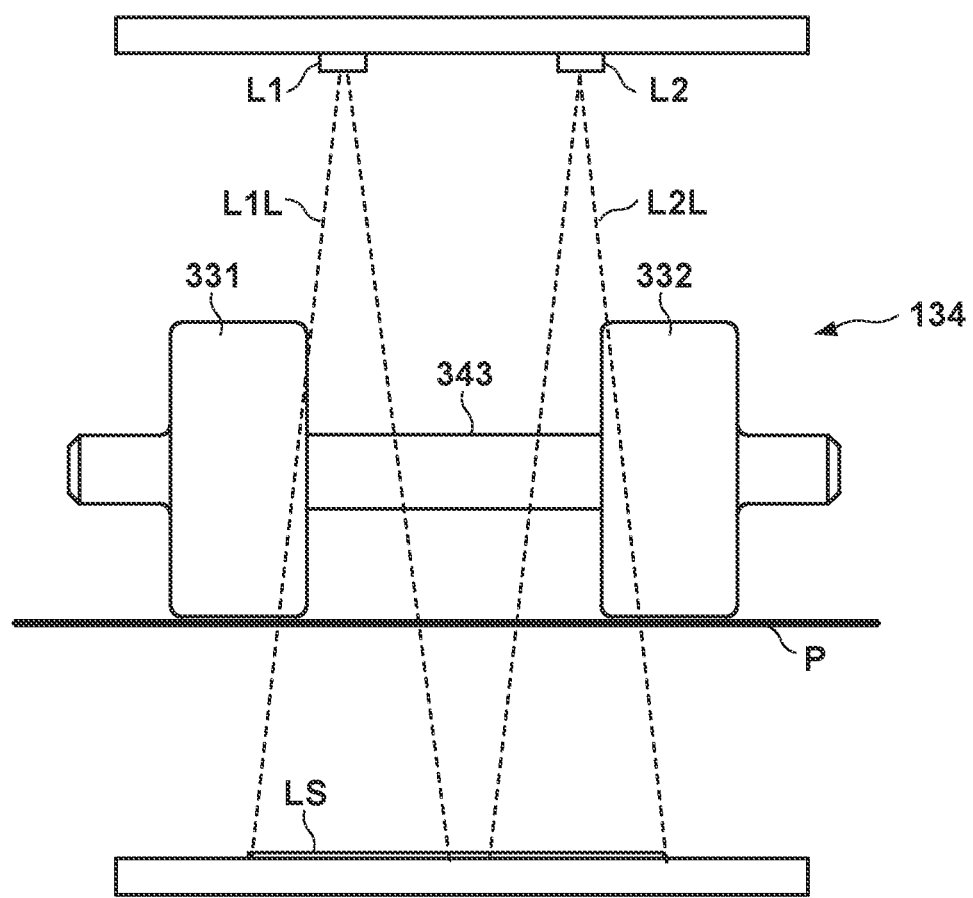
FIG. 14 is a diagram for illustrating an operation of a moisture detecting apparatus according to an embodiment.
Figure 15:
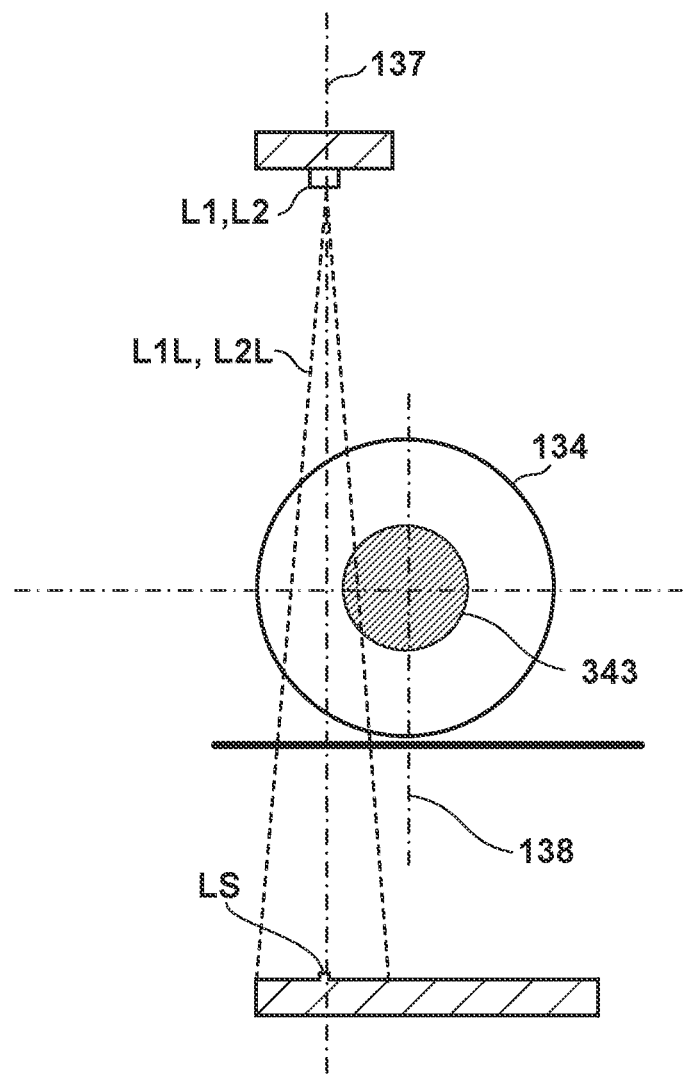
FIG. 15 is a diagram for illustrating an operation of a moisture detecting apparatus according to an embodiment.

Next, regarding a fifth embodiment, the difference from the fourth embodiment will be mainly described. FIGS. 14 and 15 are configuration diagrams of the moisture detecting apparatus 35 according to this embodiment, and correspond to FIGS. 12 and 13 in the fourth embodiment. Note that constituent elements similar to the moisture detecting apparatus 35 according to the fourth embodiment are given the same reference signs and description thereof is omitted. In this embodiment, a pressing rotational body 134 is used instead of the pressing rotational body 133 in the fourth embodiment. Similarly to the fourth embodiment, the pressing rotational body 134 is provided with two cylindrical members 331 and 332 having the same diameter that press the recording material P, and a connecting member 343 that connects the cylindrical members 331 and 332. The two cylindrical members 331 and 332 are arranged at different positions in the direction orthogonal to the conveyance direction of the recording material, and the connecting member 343 is a member extending in the direction orthogonal to the conveyance direction of the recording material, and includes the rotational axis of the pressing rotational body 34. However, the diameter of the connecting member 343 is set to be smaller than that of the connecting member 333 in the fourth embodiment. In other words, the area of the cross section orthogonal to the rotational axis of the connecting member 343 is set to be smaller than the area of the cross section orthogonal to the rotational axis of the cylindrical members 331 and 332. In addition, in the fourth embodiment, the rotational center of the pressing rotational body 133 is located on a line connecting the light emitting elements L1 and L2 with the line light receiving element LS in the conveyance direction of the recording material. In this embodiment, as shown in FIG. 15, a position 138 of the rotational center of the pressing rotational body 134 in the conveyance direction of the recording material is shifted by a predetermined distance to the upstream side in the conveyance direction of the recording material from the position 137 in the fourth embodiment.

Accordingly, the light L1L and the light L2L received by the line light receiving element LS do not pass through the connecting member 343. Note that, as shown in FIG. 14, the light L1L and the light L2L received by the line light receiving element LS include the light that have passed through the cylindrical members 331 and 332. However, it is also possible to adjust the area in which the line light receiving element LS is arranged such that the line light receiving element LS is configured to receive only the light L1L and the light L2L that do not pass through the pressing rotational body 134. By doing this, the line light receiving element LS can receive a light in which the attenuation of light caused by the pressing rotational body 134 is suppressed. Since the light receiving amount of the line light receiving element LS increases, it is possible to detect the moisture content contained in the recording material P with high accuracy.

Note that the shift amount of the rotational center to the upstream side in the conveyance direction of the recording material is decided within the range in which flapping of the recording material P on the light path from the light emitting elements L1 and L2 to the line light receiving element LS can be suppressed. For an example, the shift amount is less than or equal to 5 mm. Alternatively, as shown in FIG. 15, a configuration is also possible in which the rotational center of the pressing rotational body is shifted in a range in which a line connecting the light emitting elements L1 and L2 with the light receiving element LS passes through the cylindrical members 331 and 332. Also, the direction of shifting the rotational center may also be the downstream side in the conveyance direction of the recording material.

As described above, the connecting member 343 including the rotational axis of the pressing rotational body 134 is arranged at a position in which the connecting member 343 does not interfere with the light path from the light emitting elements L1 and L2 to the line light receiving element LS. By this configuration, the attenuation of light by the pressing rotational body 134 is suppressed, and thus it becomes possible to detect the value related to the moisture content of the recording material with high accuracy. Note that, in this embodiment, the pressing rotational body 134 need not be formed with a transparent member.

Sixth Embodiment

Figure 16:
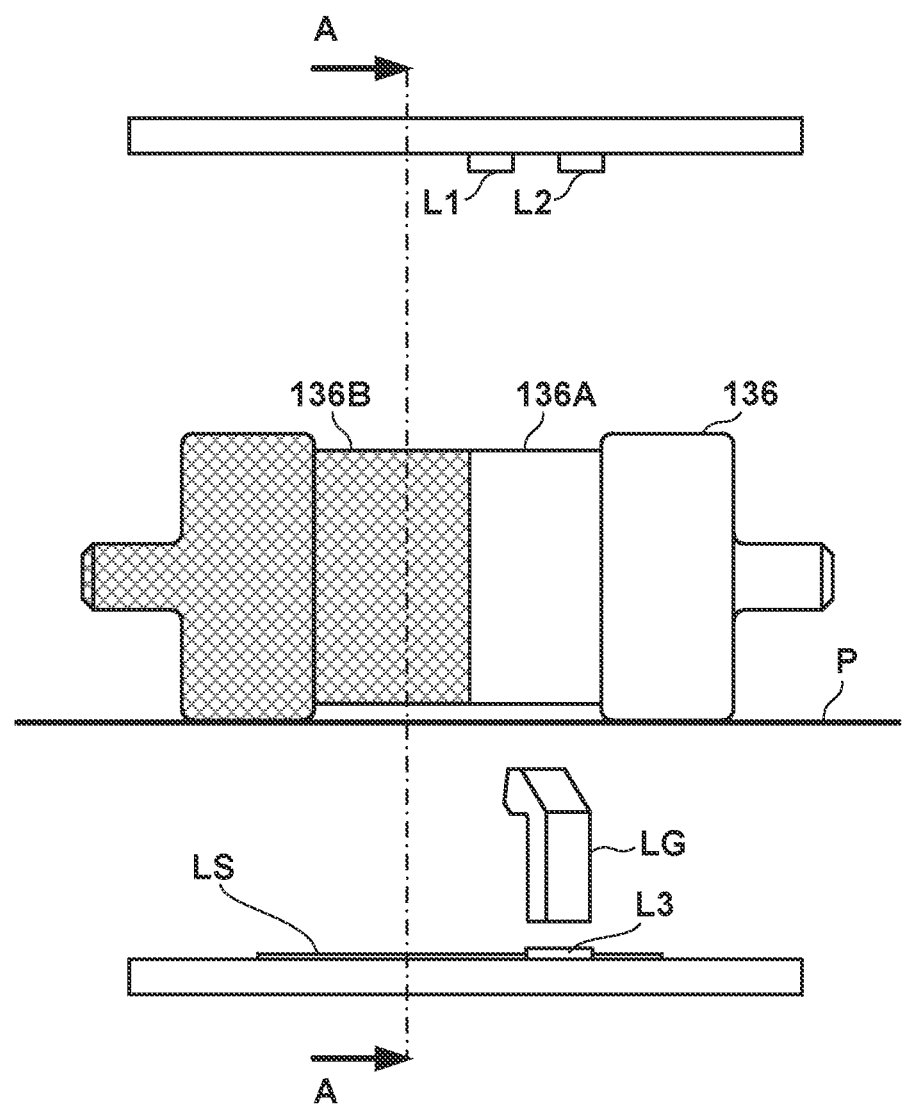
FIG. 16 is a configuration diagram of a moisture detecting apparatus according to an embodiment.
Figure 17:
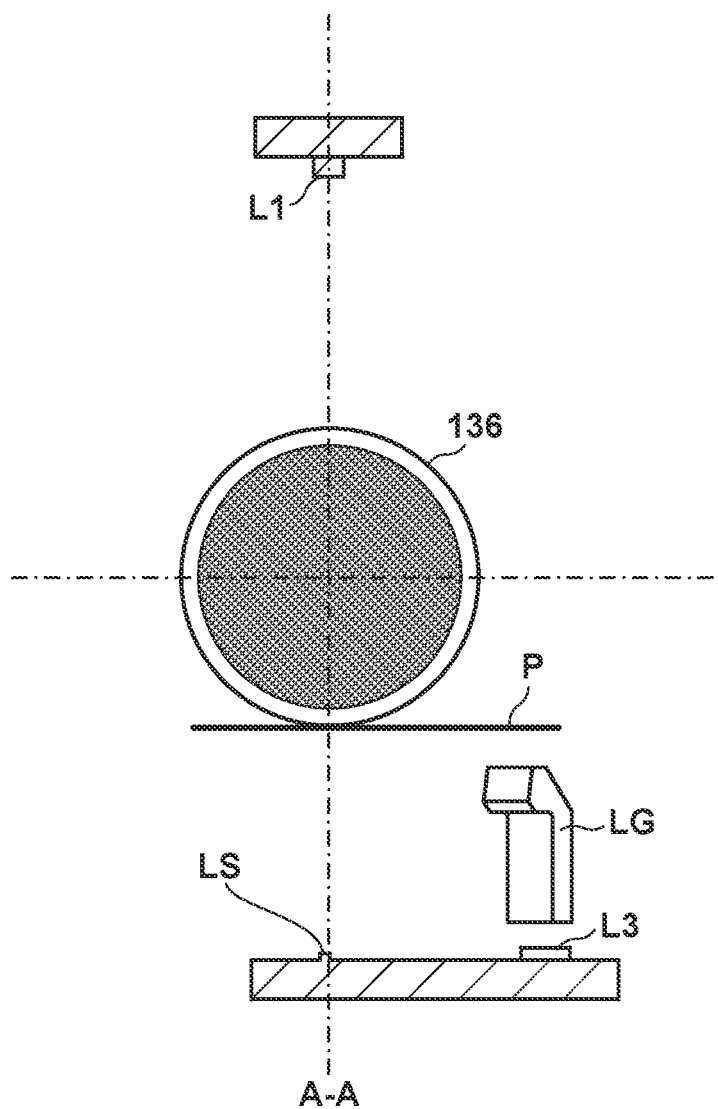
FIG. 17 is a configuration diagram of a moisture detecting apparatus according to an embodiment.

Next, regarding a sixth embodiment, the difference from the fourth embodiment will be mainly described. FIGS. 16 and 17 are perspective views showing a configuration of the moisture detecting apparatus 35 according to this embodiment. Note that FIG. 17 is a diagram viewed from upstream side in the conveyance direction of the recording material P, and FIG. 17 is a cross-sectional view along a line A-A in FIG. 16. Note that constituent elements similar to those described in the fourth embodiment are given the same reference signs and description thereof is omitted. As shown in FIG. 16, in this embodiment, the arrangement positions of the light emitting elements L1 and L2 are shifted in the direction orthogonal to the conveyance direction compared to the configuration in the fourth embodiment. Although the arrangement position is shifted to the right side in FIG. 16, shifting to the left side is also possible. In addition, instead of the pressing rotational body 133, a pressing rotational body 136 constituted with a transparent member 136A and a black member 136B (shaded area) is used. The black member 136B is provided so as to be located on a different side from the side to which the light emitting elements L1 and L2 are shifted. In addition, a light emitting element L3 and a light guide LG that guides the light emitted from the light emitting element L3 to the recording material P are provided on the same board as the line light receiving element LS.

The light emitting element L3 and the light guide LG are provided to determine the surface property of the recording material. The principle of determination of the surface property is disclosed in Japanese Patent Laid-Open No. 2014-114131, for example. In brief, light emitted from the light emitting element L3 is irradiated onto the surface of the recording material P via the light guide LG, and the reflected light is received by the line light receiving element LS. There is a relationship between the extent of irregularity of the surface of the recording material P and the reflected light amount. Accordingly, a table indicating the relationship between the extent of irregularity and the reflected light amount is set in the image forming apparatus in advance, and the control unit 10 determines the surface property of the recording material based on the table and the light receiving amount of the line light receiving element LS for the reflected light of the light emitted from the light emitting element L3.

Figure 18:
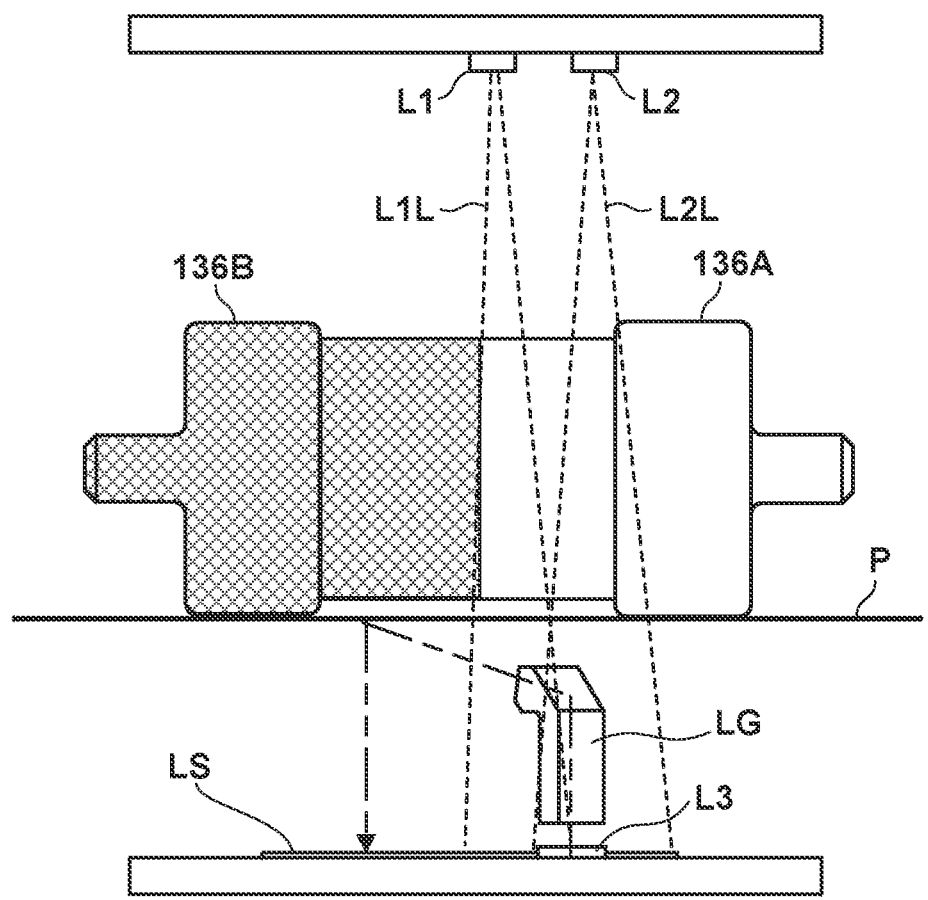
FIG. 18 is a diagram for illustrating an operation of a moisture detecting apparatus according to an embodiment.

FIG. 18 shows a state in which the light emitting elements L1, L2, and L3 are caused to emit light, and corresponds to FIG. 12 in the fourth embodiment. The light emitted from the light emitting elements L1 and L2 is, similarly to the first embodiment, received by the line light receiving element LS via the transparent member 136A of the pressing rotational body 136. However, in this embodiment, since the light emitting elements L1 and 12 are shifted to the right side in the diagram, the light L1L and the light L2L are received by the light receiving element of the line light receiving element LS in the right half of the diagram. On the other hand, the light emitted from the light emitting element L3 is irradiated onto the surface of the recording material P from the lower side in the diagram, via the light guide LG. The light receiving element having an area that is different from the area in which the light L1L and the light L2L of the line light receiving element LS is received the reflected light of the light emitted from this light emitting element L3. The black member 136B of the pressing rotational body 136 is located on the upside of the light receiving area of the line light receiving element LS which receives the light emitted from the light emitting element L3. That is, the black member 136B of the pressing rotational body 136 is arranged in a position opposing the light receiving area of the line light receiving element LS which receives the light emitted from the light emitting element L3, via the recording material P. The black member 136B transmits a smaller amount of light than the transparent member 136A. Accordingly, due to this black member 136B, it is possible to suppress transmitted light from the recording material P that is emitted by the light emitting elements L1 and L2 and external light from entering the light receiving element of the line light receiving element LS that receives the reflected light of the light emitted from the light emitting element L3. Therefore, it is possible to suppress deterioration of the determination accuracy of the surface property of the recording material P.

As described above, in this embodiment, it is possible to provide the moisture detecting apparatus 35 with a function of determining the surface property of the recording material, and thus the surface property detection unit 32 can be omitted and the image forming layer can be minimized.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-078477, filed on Apr. 11, 2017 and Japanese Patent Application No. 2017-078478, filed on Apr. 11, 2017, which are hereby incorporated by reference herein in their entirety.

What is claimed is:

1. A moisture detecting apparatus comprising:
a light emitting unit including a first light source configured to emit light having a first wavelength of visible light or near-infrared light as a peak wavelength, and a second light source configured to emit light having a second wavelength of visible light or near-infrared light that is longer than the first wavelength as a peak wavelength;
a light receiving unit configured to receive light emitted from the first light source and transmitted through a recording material, and light emitted by the second light source and transmitted through the recording material;
a detecting unit configured to detect a first detection value indicating an extent to which the light emitted from the first light source is transmitted through the recording material, and a second detection value indicating an extent to which the light emitted by the second light source is transmitted through the recording material, based on a light receiving result of the light receiving unit; and
a determination unit configured to determine a value related to a moisture content of the recording material based on the first detection value and the second detection value.

2. The moisture detecting apparatus according to claim 1, wherein the determination unit is further configured to determine the value related to the moisture content of the recording material based on a difference or a ratio between the first detection value and the second detection value.

3. The moisture detecting apparatus according to claim 1, wherein the determination unit is further configured to determine that, if a difference obtained by subtracting the first detection value from the second detection value is small, the moisture content contained in the recording material is high compared with a case where the difference is large, or to determine that, if a ratio obtained by dividing the second detection value by the first detection value is small, the moisture content contained in the recording material is high compared to a case where the ratio is large.

4. The moisture detecting apparatus according to claim 1, further comprising a detecting unit configured to detect a basis weight of the recording material,
wherein the determination unit is further configured to determine the value related to the moisture content of the recording material based on the basis weight of the recording material.

5. The moisture detecting apparatus according to claim 4, wherein the detection unit includes a transmitting unit configured to transmit an ultrasonic wave, and a receiving unit configured to receive the ultrasonic wave transmitted from the transmitting unit via the recording material, and is further configured to detect the basis weight of the recording material based on the ultrasonic wave received by the receiving unit.

6. The moisture detecting apparatus according to claim 4, wherein the detection unit is further configured to detect the basis weight of the recording material based on the first detection value or the second detection value.

7. The moisture detecting apparatus according to claim 1, wherein the detection unit is further configured to detect the first detection value based on a first light receiving amount obtained when light emitted from the first light source is received without being transmitted through the recording material and a second light receiving amount obtained when light emitted from the first light source is received after being transmitted through the recording material, and detect the second detection value based on a third light receiving amount obtained when light emitted from the second light source is received without being transmitted through the recording material and a fourth light receiving amount obtained when light emitted from the second light source is received after being transmitted through the recording material.

8. The moisture detecting apparatus according to claim 7, wherein the second light receiving amount is an average value of light receiving amounts obtained by measuring, a plurality of times, light that is emitted from the first light source and transmitted through the recording material, while conveying the recording material, and the fourth light receiving amount is an average value of light receiving amounts obtained by measuring, a plurality of times, light that is emitted from the second light source and transmitted through the recording material, while conveying the recording material.

9. The moisture detecting apparatus according to claim 7, wherein the first detection value is a value based on a ratio of the first light receiving amount and the second light receiving amount, and the second detection value is a value based on a ratio of the third light receiving amount and the fourth light receiving amount.

10. The moisture detecting apparatus according to claim 7, wherein measurement of the first light receiving amount and measurement of the third light receiving amount are performed in parallel, and measurement of the second light receiving amount and measurement of the fourth light receiving amount are performed in parallel.

11. The moisture detecting apparatus according to claim 1, wherein the first wavelength is a wavelength of visible light, and the second wavelength is a wavelength of near-infrared light.

12. The moisture detecting apparatus according to claim 1, wherein the light receiving unit has light receiving sensitivity in a wavelength band of approximately 400 to 1000 nm.

13. The moisture detecting apparatus according to claim 1, further comprising a rotational body that is provided between the light emitting unit and the light receiving unit, and is configured to apply pressure to the recording material that is conveyed along a conveyance path.

14. The moisture detecting apparatus according to claim 13, wherein the rotational body is configured to rotate dependent on conveyance of the recording material.

15. The moisture detecting apparatus according to claim 14, wherein the determination unit determines the value related to the moisture content contained in the recording material, based on the amounts of light, received by the light receiving unit while the rotational body is rotating dependent on conveyance of the recording material, that are respectively emitted by the first light source and the second light source and transmitted through the recording material.

16. The moisture detecting apparatus according to claim 13, wherein the rotational body includes a first area that transmits light.

17. The moisture detecting apparatus according to claim 16, wherein the light receiving unit receives light that is emitted from the light emitting unit and has passed through the first area.

18. The moisture detecting apparatus according to claim 16, wherein the first area suppresses spreading of light emitted from the first light source and light emitted from the second light source in the conveyance direction of the recording material.

19. The moisture detecting apparatus according to claim 18, wherein the first area collects light emitted from the first light source and light emitted from the second light source to the light receiving unit.

20. The moisture detecting apparatus according to claim 16, wherein the first area is an area constituted with a transparent member.

21. The moisture detecting apparatus according to claim 16, further comprising another light emitting unit on a same side as the light receiving unit with respect to the conveyance path, wherein the rotational body includes the first area and a second area in which transmitted light is weaker than the first area, and is provided on the light emitting unit side relative to the conveyance path, the light receiving unit further receives light emitted from the other light emitting unit and reflected by the recording material, the determination unit further determines a surface property of the recording material based on the light emitted from the other light emitting unit and reflected by the recording material that is received by the light receiving unit, and the second area is located at a position opposing, via the recording material, an area of the light receiving unit that receives the light emitted from the other light emitting unit and reflected by the recording material.

22. The moisture detecting apparatus according to claim 21, wherein the second area is an area constituted with a black member.

23. The moisture detecting apparatus according to claim 13, wherein a rotational axis of the rotational body, the light emitting unit, and the light receiving unit are arranged in a same plane.

24. The moisture detecting apparatus according to claim 13, wherein the rotational body includes two cylindrical members that are arranged at different positions in a direction orthogonal to the conveyance direction of the recording material and configured to apply pressure to the recording material, and a connecting member that contains a rotational axis of the rotational body and connects the two cylindrical members, and the connecting member is provided in a position that does not interfere with the light paths of the light of the first wavelength and the light of the second wavelength from the light emitting unit to the light receiving unit.

25. The moisture detecting apparatus according to claim 24, wherein an area of a cross-section orthogonal to the rotational axis of the connecting member is smaller than an area of a cross-section orthogonal to the rotational axes of the two cylindrical members.

26. The moisture detecting apparatus according to claim 13, wherein the light receiving unit includes a plurality of light receiving elements arranged in a direction orthogonal to the conveyance direction of the recording material.

27. An image forming apparatus comprising:
    an image forming unit configured to form an image on a recording material;
    a moisture detecting unit configured to detect a value related to a moisture content of the recording material; and
    a control unit configured to control an image forming condition on which the image is formed on the recording material, based on the value related to the moisture content of the recording material detected by the moisture detecting unit, wherein the moisture detecting unit includes:
a light emitting unit including a first light source configured to emit light having a first wavelength of visible light or near-infrared light as a peak wavelength, and a second light source configured to emit light having a second wavelength of visible light or near-infrared light that is longer than the first wavelength as a peak wavelength;
a light receiving unit configured to receive light emitted from the first light source and transmitted through the recording material, and a light emitted from the second light source and transmitted through the recording material;
a detecting unit configured to detect a first detection value indicating an extent to which the light emitted from the first light source is transmitted through the recording material, and a second detection value indicating an extent to which the light emitted from the second light source is transmitted through the recording material, based on a light receiving result of the light receiving unit; and
a determination unit configured to determine the value related to the moisture content of the recording material based on the first detection value and the second detection value.

28. The image forming apparatus according to claim 27, wherein the image forming unit includes a transferring unit configured to transfer an image to the recording material, and
the control unit controls a transfer voltage or a transfer current at which the transferring unit transfers the image to the recording material, based on the value related to the moisture content of the recording material.

29. The image forming apparatus according to claim 27, wherein the image forming unit includes a fixing unit configured to fix an image to the recording material, and
the control unit controls a fixing temperature at which the fixing unit fixes the image to the recording material, based on the value related to the moisture content of the recording material.

* * * * *